| (12) United States Patent<br>Sayers et al. | (10) Patent No.: US 7,677,873 B2<br>(45) Date of Patent: Mar. 16, 2010 |
|---|---|

(54) APPARATUS AND METHOD FOR MOLDING ONTO A STRETCHED BLANK

(75) Inventors: Randy J. Sayers, Belding, MI (US); Pierre Tremblay, Clarksville, MI (US); Kelly E. Washburn, Allegan, MI (US); Kenneth A. Longstreet, Grant, MI (US)

(73) Assignee: Illinois Tool Works Inc., Glenview, IL (US)

( * ) Notice: Subject to any disclaimer, the term of this patent is extended or adjusted under 35 U.S.C. 154(b) by 1005 days.

(21) Appl. No.: 10/573,397

(22) PCT Filed: Oct. 12, 2004

(86) PCT No.: PCT/US2004/033583

§ 371 (c)(1),
(2), (4) Date: Mar. 22, 2006

(87) PCT Pub. No.: WO2005/046952

PCT Pub. Date: May 26, 2005

(65) Prior Publication Data

US 2007/0116795 A1 May 24, 2007

Related U.S. Application Data

(60) Provisional application No. 60/517,274, filed on Nov. 4, 2003.

(51) Int. Cl.
*B29C 31/08* (2006.01)
(52) U.S. Cl. .................... 425/111; 264/257; 264/290.2; 38/102.1
(58) Field of Classification Search ................. 425/111; 264/257, 290.2; 101/127; 38/102.1
See application file for complete search history.

(56) References Cited

U.S. PATENT DOCUMENTS 2,759,217 A * 8/1956 Peterson ................... 38/102.4

(Continued)

FOREIGN PATENT DOCUMENTS

JP 04085013 3/1992

OTHER PUBLICATIONS

RD 419043 A (Anonymous) Feb. 20, 1999.
English Abstract of Japanese Patent 04085013.
Supplementary European Search Report dated Jun. 5, 2009.

*Primary Examiner*—Christina Johnson
*Assistant Examiner*—Galen Hauth
(74) *Attorney, Agent, or Firm*—Mark W. Croll; Paul F. Donovan

(57) ABSTRACT

An apparatus and method for molding a component onto a stretched blank. The apparatus includes a stretching assembly mounted adjacent to a first mold part. The stretching assembly includes a plurality of clamp assemblies that grasp the peripheral edge of the blank and a plurality of slide assemblies that move the clamp assemblies away from one another to apply a stretch to the fabric. The apparatus further includes a press for closing a second mold part onto the first mold part while the fabric is held in a stretched condition by the stretching assembly. In one embodiment, the stretching assembly may include a float plate that is movable with respect to the first mold part between a stretch position and a mold position. The apparatus may include a robot with tooling for moving the fabric onto the stretching assembly. The tooling may include a plurality of shot pins that push the fabric off of the tooling onto corresponding fabric pins in the stretching machine. In one embodiment, the apparatus include a stretch measuring device adapted to measure the stretch applied to the fabric.

15 Claims, 22 Drawing Sheets

U.S. PATENT DOCUMENTS

| | | | |
|---|---|---|---|
| 3,391,635 A | | 7/1968 | Matheus |
| 3,466,706 A | * | 9/1969 | Asano .......................... 269/94 |
| 3,482,343 A | | 12/1969 | Hamu |
| 3,880,561 A | * | 4/1975 | Ferro .......................... 425/144 |
| 4,022,091 A | * | 5/1977 | Frigo .......................... 83/175 |
| 4,269,579 A | | 5/1981 | Thomas |
| 4,442,772 A | | 4/1984 | Bubbley |
| 5,235,908 A | | 8/1993 | Froelicher et al. |
| 5,271,171 A | | 12/1993 | Smith |
| 5,679,301 A | | 10/1997 | Miklas et al. |
| 6,059,368 A | * | 5/2000 | Stumpf et al. .......... 297/440.11 |
| 6,167,603 B1 | | 1/2001 | Zeiler et al. |
| 6,328,548 B1 | | 12/2001 | Salas et al. |
| 6,361,654 B1 | * | 3/2002 | Chuang et al. .............. 162/204 |

* cited by examiner

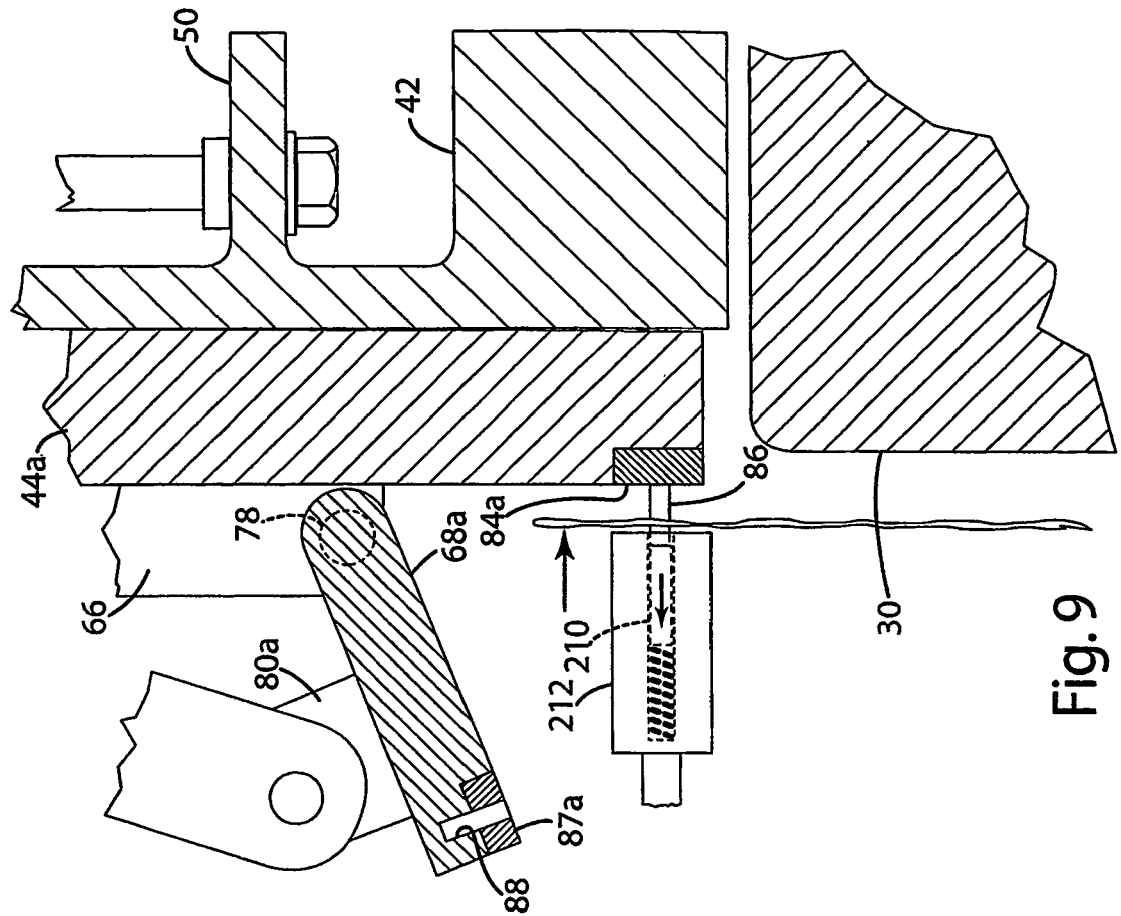
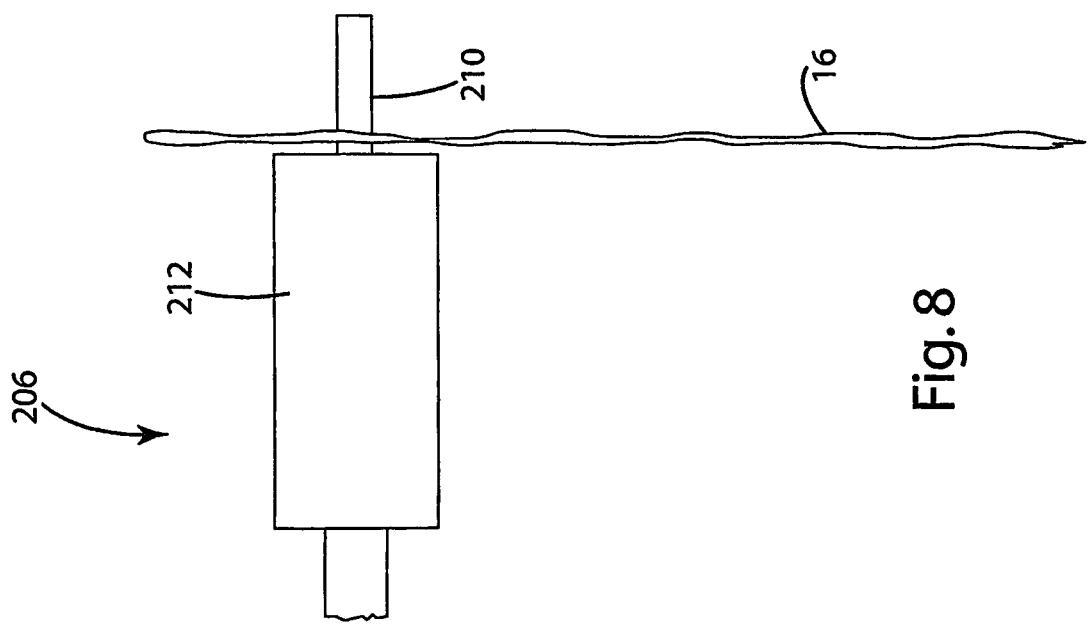

APPARATUS AND METHOD FOR MOLDING ONTO A STRETCHED BLANK

RELATED APPLICATION

This application claims the benefit of U.S. Provisional Application No. 60/517,274, filed Nov. 4, 2003.

BACKGROUND OF THE INVENTION

The present invention relates to molding apparatus and methods, and more particularly to apparatus and methods for molding onto a loaded, elastic blank.

The development of high tech fabrics has permitted the incorporation of fabric into a wide variety of applications not previously consider appropriate for fabrics. For example, certain high tech fabrics have been developed that include a weave of multifilament yarns and elastomeric monofilaments. These fabrics provide remarkable load bearing characteristics, while at the same time providing appropriate elasticity to be comfortable as a load bearing fabric in seating applications. More specifically, these fabrics are now widely used to form the seats and backs of office chairs and other seating structures To enable attachment of the fabric to a chair seat or other support structure, it is known to mold a mounting component directly onto the fabric. The mounting component is typically molded about the periphery of the fabric to provide a structure that can be mounted to a frame or other support structure. In many applications, it is desirable to mount the fabric to the chair in a stretched (or loaded) condition primarily because the stretched fabric provides more desirable comfort characteristics. The desire to have a loaded fabric complicates the manufacturing process—at least with respect to the process of molding the mounting component onto the fabric.

One current process for manufacturing chair components with a loaded fabric is to stretch the fabric before it is placed in the mold for forming the mounting component. In one known embodiment of this process, the fabric is stretched prior to molding using stretching machine that is located remotely from the mold. An operator loads a section of fabric into the stretching machine. The stretching machine clamps the fabric around its periphery and stretches the fabric to the desired tension. Once stretched the fabric is shuttled to a loom station. At this station, a loom is closed onto the fabric to hold it in the stretched condition. The loom is then moved to the mold and positioned so that the fabric is properly oriented with respect to the mold surfaces. The mold is closed about the fabric while it continues to be held in the stretched position by the loom. Once the molding process is complete, the loom carrying the fabric and attached mounting component are removed from the mold and returned to the loom station. The loom is removed at the loom station and the fabric and attached mounting component are returned to the operator. The assembly is finished, for example, by trimming the excess fabric from the assembly. Although effective, this process and the associated apparatus suffer from various disadvantages. For example, the apparatus is relatively expensive because it requires a stretching machine, a loom and a mold that are specially configured to interact with one another. Also, this process results a relatively large amount of waste fabric, which can be a significant problem because of the high cost of high tech fabrics. With this process, the fabric must include a significant peripheral marginal portion that can be gripped and held during the stretching, looming and molding steps. This marginal portion must be large enough not only to extend outside of the mold to the loom but also outside of the loom to the stretching machine. After molding, this peripheral marginal portion serves no function and is trimmed away and discarded as waste. Further, once the fabric is stretched, it begins to decay at the locations where it is attached to the stretching machine or loom due to the focused stress. The decay continues until such time as the mounting component is formed to distribute the stretching forces over-a greater portion of the fabric. This apparatus also requires a relatively large amount of floor space to accommodate the separate stretching machine, loom machine and mold. Additionally, the apparatus presents quality control concerns. The apparatus utilizes strain gauges in the stretching machine to apply the desired stretch to the fabric. In operation, the stretching machine monitors the amount of resistance provided by the stretched fabric. Once the predetermined resistance is reached, the stretching device stops stretching the fabric and the loom is closed onto the fabric. Once the loom is closed on the fabric, the system no longer knows anything about the state or condition of the fabric. This can present problems because the fabric is under a significant load and may partially separate from the loom in one location or another. Any separation or other defects that arise after the loom is installed will go unnoticed by the system. This may result in defective parts.

A number of methods have been developed that overcome some of the disadvantages of this apparatus. In one alternative, the fabric is stretched by the closing action of the mold. In this alternative, the edges of the fabric are held and the mold parts are specially shaped so that movement of the mold parts together causes the fabric to stretch. This process requires a specific amount of stretch to be built into the mold and does not provide the ability to adjust the stretch. In another alternative, hydraulic components are included in the mold. The hydraulic components are moved after the fabric has been closed in the mold to apply the desired amount of stretch. Although providing some benefits, these alternative methods continue to suffer from a variety of problems ranging from high cost to product quality issues.

SUMMARY OF THE INVENTION

The aforementioned problems are overcome by the present invention wherein a molding apparatus for molding a component onto a stretched blank is provided with an integrated stretching assembly. In one embodiment, the stretching assembly is disposed about the mold and includes a plurality of clamp assemblies to grip the periphery of a blank. The clamp assemblies are selectively movable away from one another to stretch the blank.

In one embodiment, the clamp assemblies are mounted to slide assemblies that are capable of inward and -outward movement along the plane of the blank. In operation, the slide assemblies are moved outwardly after the blank has been clamped. The amount of movement is selected to provide the desired stretch. The apparatus may include four clamp assemblies and four slide assemblies disposed in a rectangular arrangement outside the mold. For example, the stretching assembly may include top, bottom, left and right clamp assemblies and slide assemblies. The apparatus may, however, include essentially any desired number of clamp assemblies and slide assemblies. For example, additional clamp assemblies and slide assemblies may be added to permit different amounts of stretch in different regions of the blank.

In one embodiment, the stretching assembly includes a float plate that is movable with respect to the mold so that the mold does not interfere with the stretching process. The float plate carries the slide assemblies and clamp assemblies and is movable between a stretch position and a mold position. In the stretch position, the float plate is positioned away from the mold so that the fabric is not in contact with any portion of the mold during the stretching process. In the mold position, the float plate is positioned over the mold with the fabric closed between the two mold parts. In one embodiment, the float plate is moved into the mold position by the closing action of the movable mold part. The float plate is not strictly necessary and may be eliminated in some applications.

In one embodiment, the apparatus includes a robot arm that places the blank in the mold. The robot arm may include a placing tool that has a plurality of shot pins that carry the fabric and transfer the fabric to corresponding fabric pins on the stretching assembly. Each shot pin may include a transfer pin that receives the fabric and a sleeve that selectively pushes the fabric off of the transfer pin. The sleeves may extend to slide the fabric off of the transfer pins onto the fabric pins or the transfer pins may retract so that the sleeves cause the fabric to slide off of the transfer pins and onto the fabric pins. In one embodiment, an air knife assembly may be mounted to the robot arm to substantially straighten the blank during the clamping process.

In yet another embodiment, the molding apparatus includes a plurality of linear transducers mounted to the slides to measure movement of the slides. The linear transducers provide a mechanism for monitoring the amount of stretch in the fabric. The molding apparatus may additionally or alternatively include strain gauges to monitor stretching based on the resistance of the stretched fabric. The control system may use the information providing by the linear transducers and strain gauges to control the stretching process and to monitor part quality.

In yet another embodiment, the molding apparatus may include a stretch measuring tool for measuring the amount of stretch applied to the fabric. The tool may be incorporated into the robot end-of-arm tooling where it can be used to measure stretch in the stretching assembly. The measuring tool generally includes a plurality of blocks movably mounted on a frame and a plurality of linear transducers that measure movement of the blocks. Each block includes one or more fabric needles that can be inserted into the fabric. In operation, the stretch measuring tool is moved toward the fabric so that the fabric needles penetrate the stretched fabric. The stretch is then removed from the fabric. As the fabric retracts, it causes the blocks to move. This movement is measured by the linear transducers and provided to the control system. The control system can use the signals from the linear transducers to collect data and ensure quality control.

The present invention also provides a molding method including the general steps of placing a blank in a stretching system, operating the stretching system to hold the peripheral marginal portion of the blank, operating the stretching system to stretch the blank, closing the mold onto the stretch blank while it is held in the stretched condition by the stretching system, molding a component onto the stretched blank, and removing the integrated blank/component from the mold. In one embodiment, the stretching system includes a plurality of clamps and the step of operating the stretching system to hold the blank includes the step of closing the clamps about the periphery of the blank. In one embodiment, the clamps are mounted on movable slides and the step of operating the stretching system to stretch the blank includes the step of moving the slides, and consequently the clamps, away from the mold to apply the desired stretch to the blank.

The present invention provides a relatively simple and effective apparatus and method for molding a component onto a loaded (or stretched) elastic blank. Because the stretching system is integrated into the mold, the loom of prior systems is eliminated saving in cost, complexity and floor space. Integration of the stretching system into the mold also reduces the time between stretching of the blank and molding of the component. This reduces, and possibly eliminates, decay in the blank. Further, the apparatus of the present invention yields less waste material because the amount of peripheral material necessary during the manufacturing process is reduced. The shot pins of the placing tool provide a relatively simple and effective mechanism for transferring the blank into the stretching assembly. The air knife assembly facilitates proper clamping of the blank by straightening out any curling in the fabric. The stretch measuring tool provides a simple and effective mechanism that can be used periodically to test for proper stretching of the fabric. The stretch measuring tool is integrated into the end-of-arm tooling so that it is readily activated when a test measurement is desired.

These and other objects, advantages, and features of the invention will be readily understood and appreciated by reference to the detailed description of the preferred embodiment and the drawings.

BRIEF DESCRIPTION OF THE DRAWINGS

FIG. 8 is an enlarged side elevational view of a portion of the placing tool showing the fabric on a transfer pin.

FIG. 9 is a side elevational view of a portion of the molding apparatus showing a shot pin retracted and the fabric moved onto the corresponding fabric pin.

Figure 1:
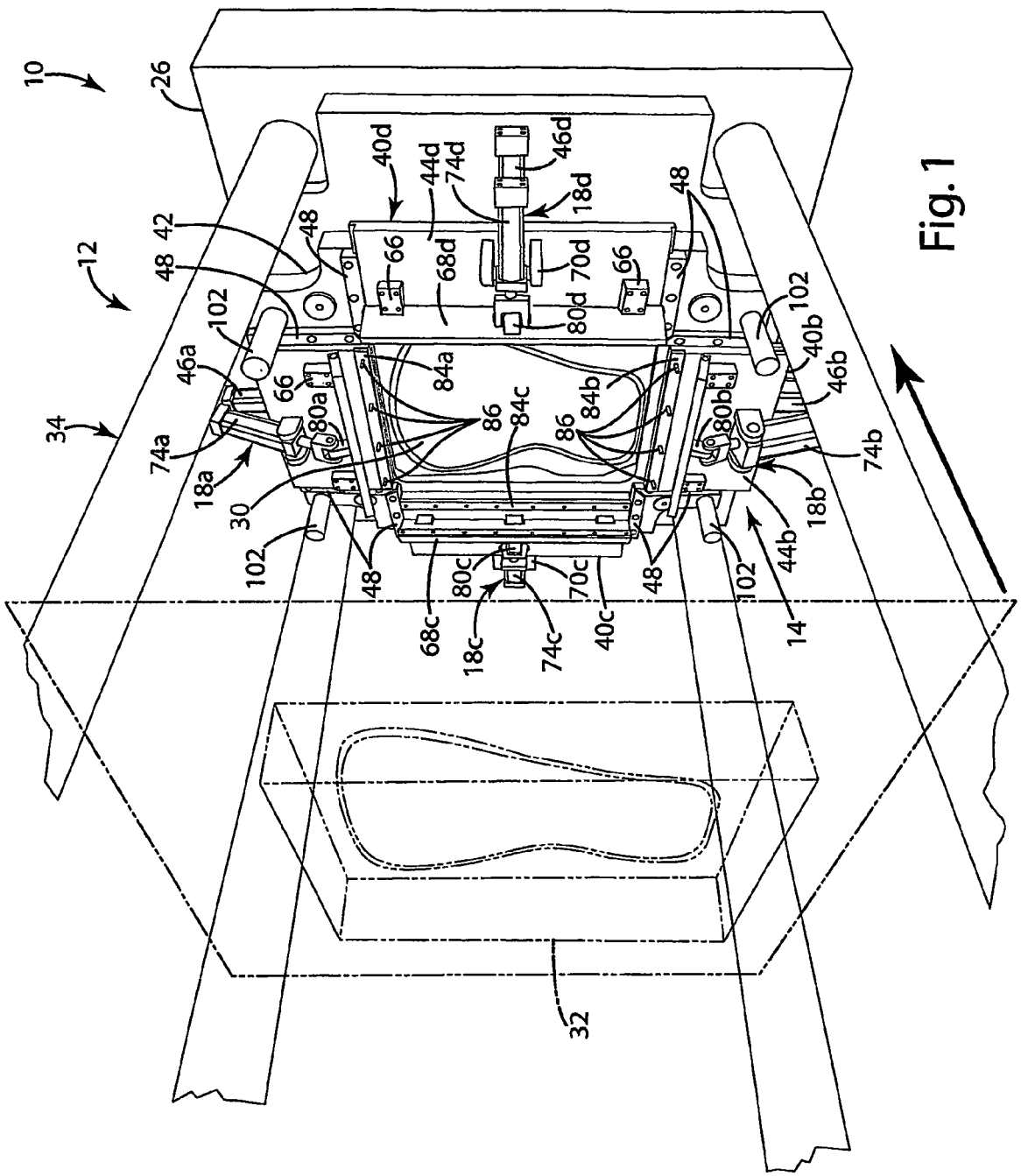
FIG. 1 is a perspective view of a molding apparatus in accordance with an embodiment of the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Figure 16:
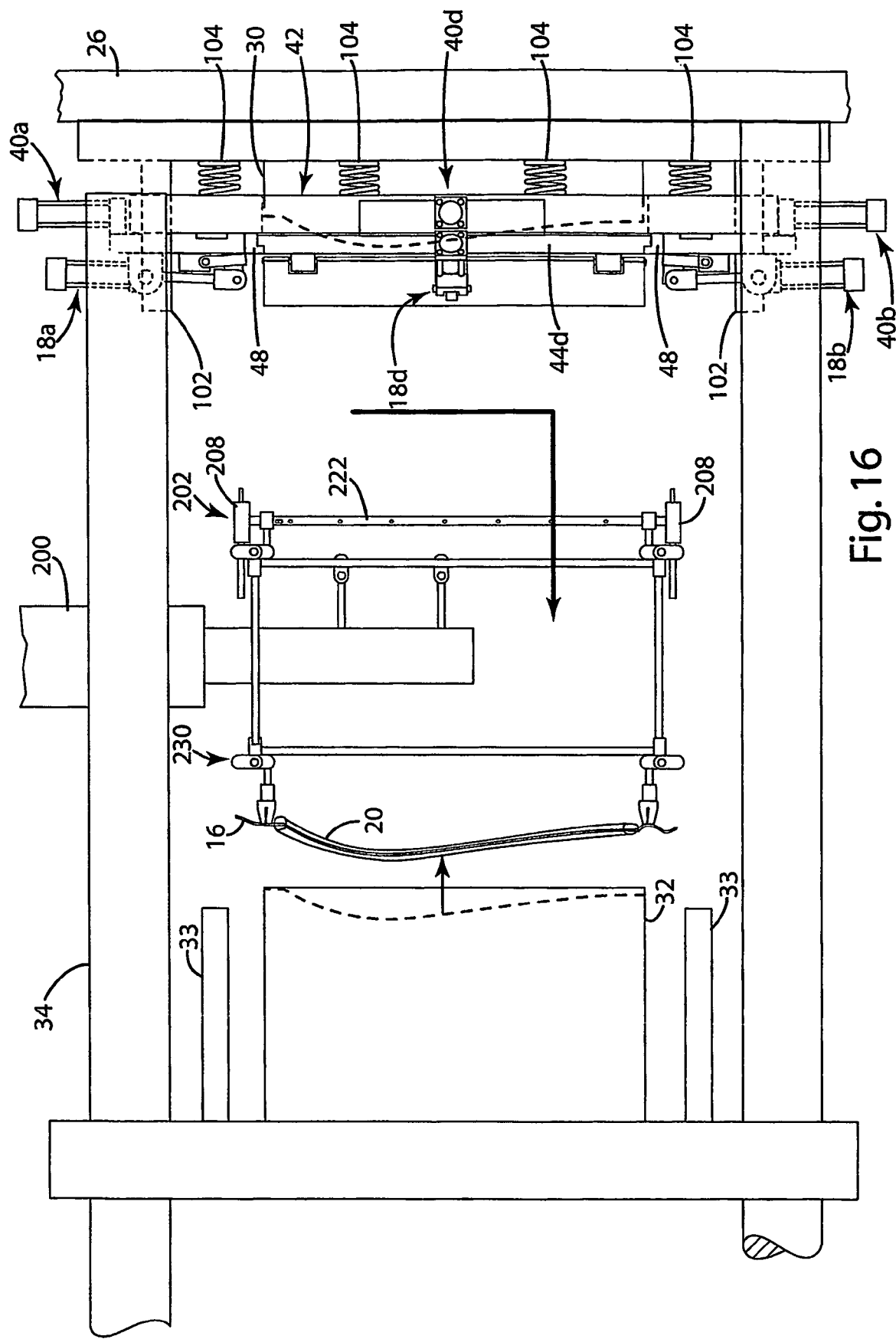
FIG. 16 is a side elevational view of the open mold with the picking tool holding the completed part.

A molding apparatus in accordance with an embodiment of the present invention is shown in FIG. 1 and generally designated 10. The molding apparatus 10 generally includes a mold 12 for molding a mounting component 20 (see FIG. 16) to a load bearing fabric 16 and a stretching assembly 14 mounted adjacent the mold 12 for stretching the load bearing fabric 16 and holding it in the stretched position during molding. The stretching assembly 14 of the illustrated embodiment generally includes a plurality of clamp assemblies 18 (such as, 18a-18d) that are operable to grip the peripheral edge of the fabric 16. The clamp assemblies 18 are movable after gripping to apply the desired degree of stretch to the fabric 16. The mold 12 is adapted to be closed over the stretched fabric 16 so that the mounting component 20 can be molded onto the fabric 16 while the fabric is held in the stretched condition by the stretching assembly 14. In this embodiment, the molding apparatus 10 also includes a robot (not shown) for loading the fabric 16 into the mold 12. The robot (not shown) includes a placing tool 202 at the end of the robot arm 200 for holding and transferring the fabric 16 (see FIGS. 6 and 7). In operation, the fabric 16 is manually loaded onto the placing tool 202. The robot arm 200 moves the placing tool 202 into a position adjacent the stretching assembly 14 and the placing tool 202 is then operated to transfer the fabric 16 onto the fabric pins 86 in the stretching assembly 14. The fabric pins 86 hold the fabric 16 in the appropriate position until the clamp assemblies 18 are closed. The present invention is described in connection with a molding apparatus intended primarily for use in molding a component onto a load bearing fabric. The present invention is not, however, limited to use with load bearing fabrics, but is well suited for use in molding a component onto essentially any stretched material. Further, the present invention is described in connection with the molding of a mounting or attachment component to the stretched blank. The present is, however, well suited for use in molding other types of components onto the stretched blank. For example, the present invention may be adapted to mold onto the blank a support frame that has sufficient structural characteristics to retain the blank in the stretched condition and support a load.

As noted above, the molding apparatus 10 includes mold 12 for forming a component 20 onto a fabric blank 16. The mold 12 is generally conventional and includes a stationary mold part 30 and a movable mold part 32. The mold parts 30 and 32 cooperate to define a mold cavity (not shown) in the shape of the desired component 20. The stationary mold part 30 is rigidly mounted to a support structure 26 and includes a plurality of alignment rods 102 that, as described below, shepherd movement of the float plate 42 and the movable mold part 32. The movable mold part 32 is mounted to any of a wide variety of conventional moving devices, such as a conventional horizontal press 34 (only partially shown in the figures) that opens and closes mold 12 by reciprocating horizontal movement of the movable mold part 32. The movable mold part 32 includes a plurality of rams 33 (see, e.g., FIG. 12) that, as described in more detail below, are used to move the float plate 42 of the stretching assembly 14 as the mold 12 is closed.

Figure 2:
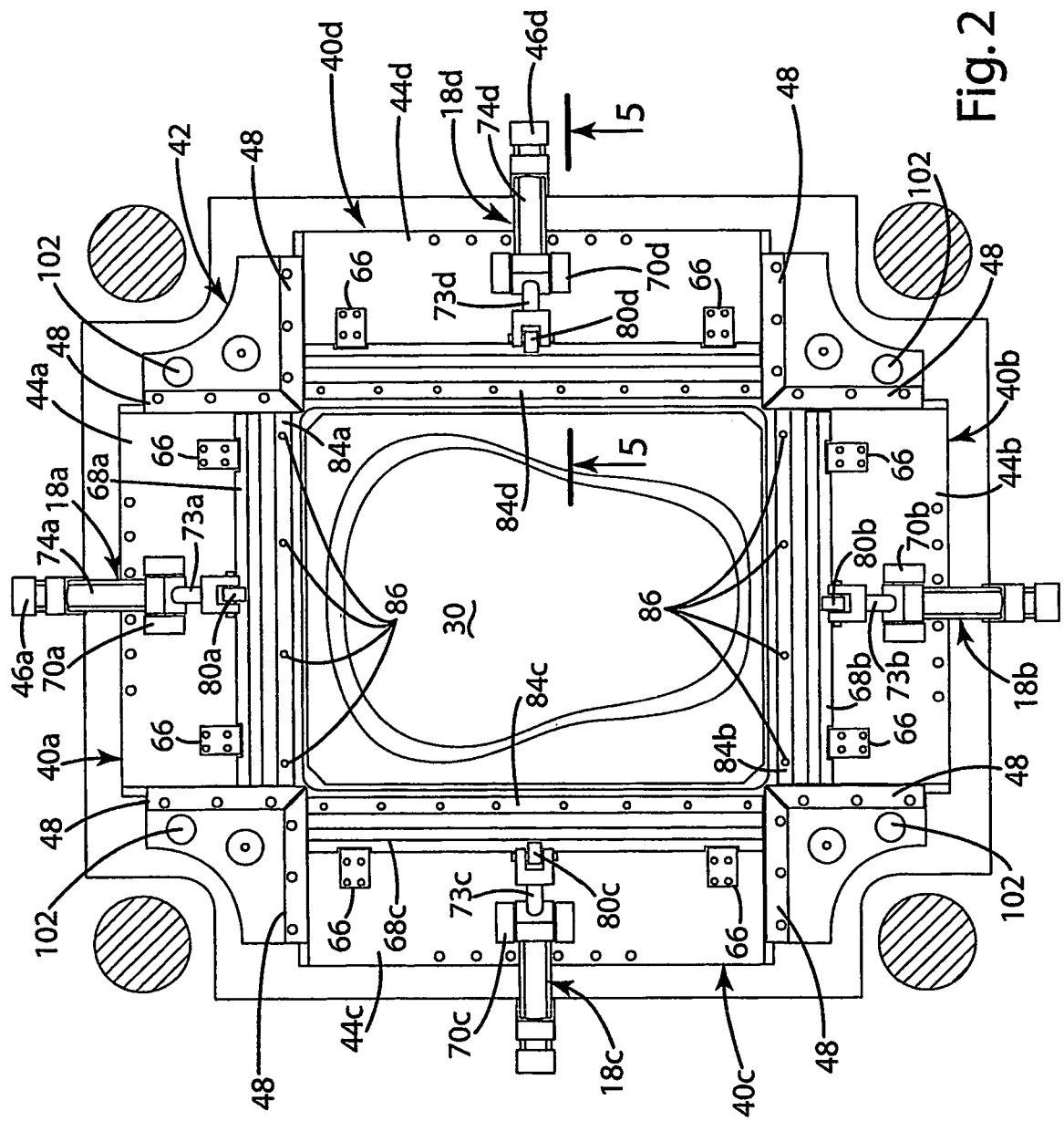
FIG. 2 is a front elevational view of the stationary mold part.
Figure 3:
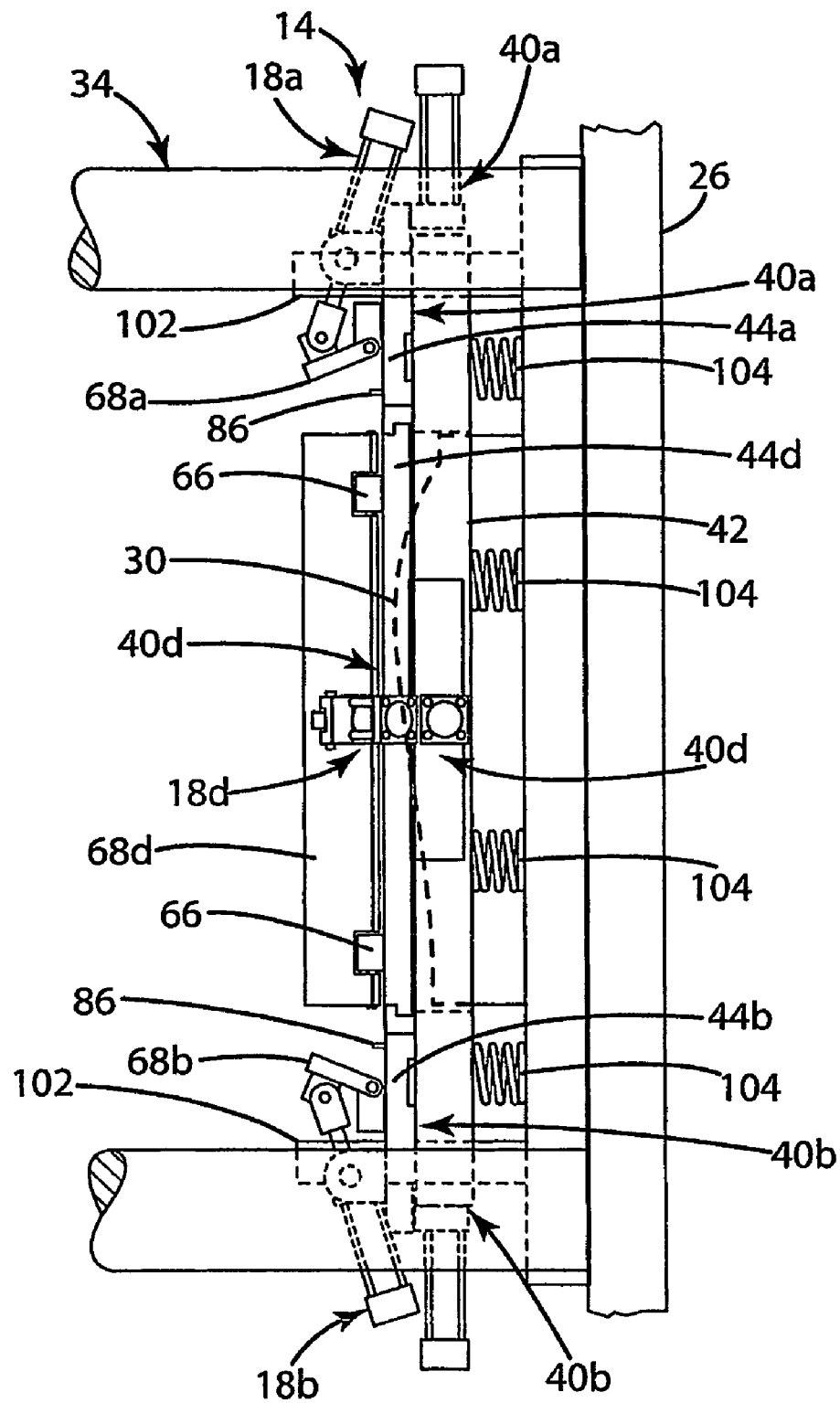
FIG. 3 is a side elevational view of the stationary mold part.
Figure 4:
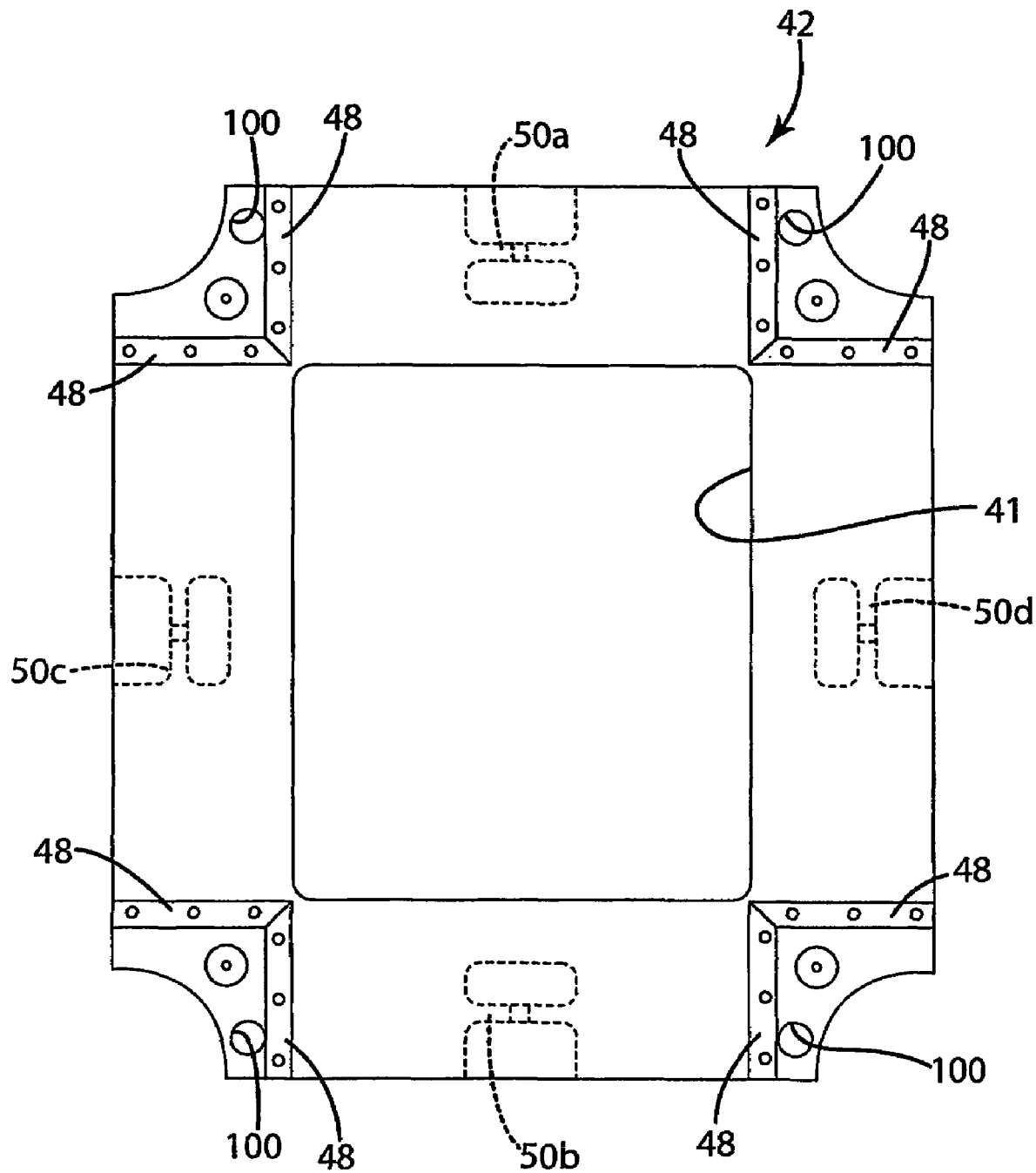
FIG. 4 is an elevational view of the float plate.
Figure 15:
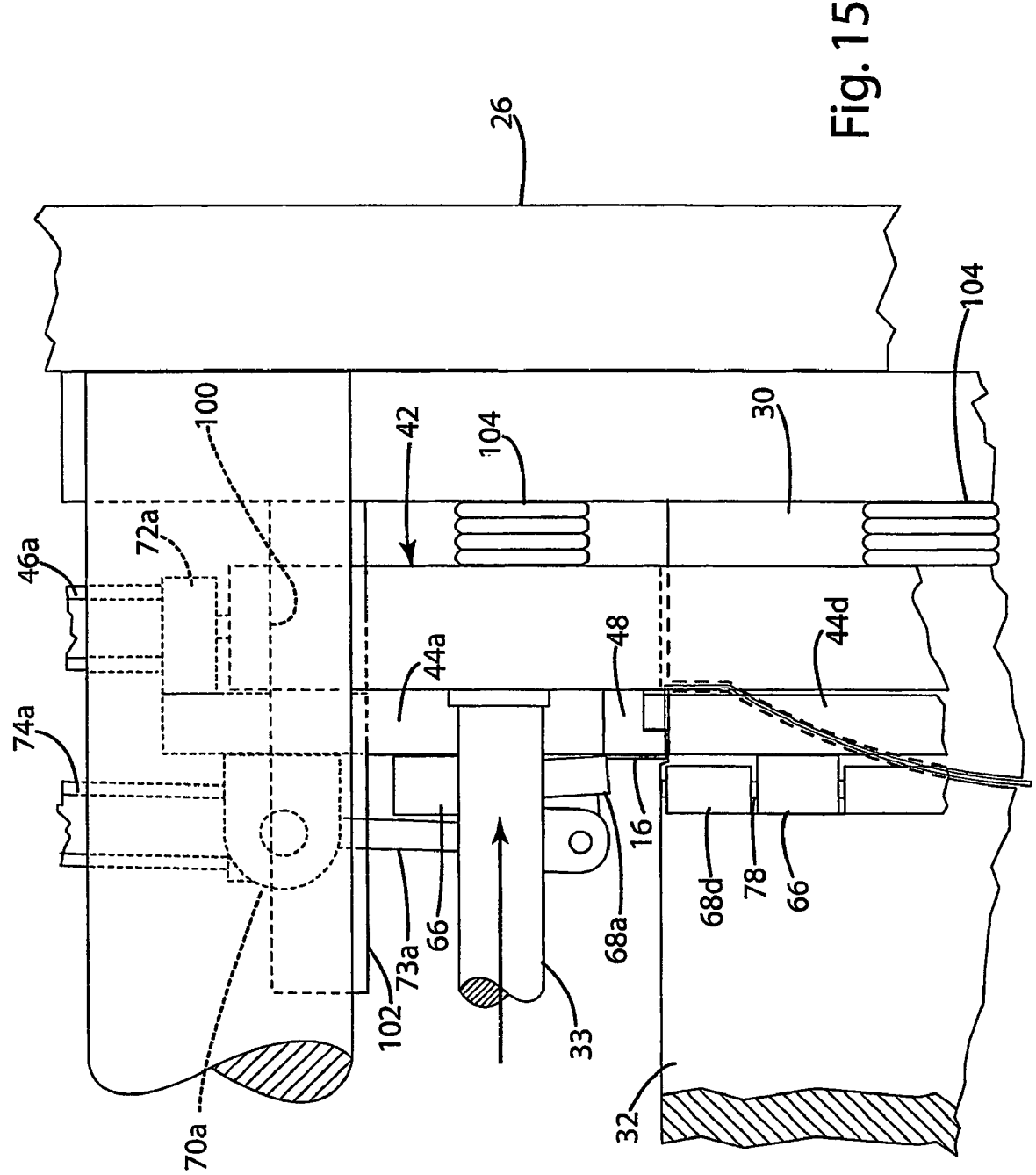
FIG. 15 is an enlarged sectional view of a portion of the molding apparatus showing the float plate in the mold position.

A stretching assembly 14 is mounted around the stationary mold part 30, but could alternatively be mounted around the movable mold part 32 or in other locations. As perhaps best shown in FIGS. 1 and 2, the stretching assembly 14 generally includes a float plate 42 that is movably mounted about the stationary mold part 30, a plurality of slide assemblies 40a-d (four in this case) that are movably mounted to the float plate 42 and a plurality of clamp assemblies 18a-d that are operatively mounted to the slides assemblies 40a-d. The float plate 42 is movable with respect to the stationary mold part 30 between a stretch position (see FIG. 3) spaced away from the stationary mold part 30 in which the fabric 16 can be loaded and stretched without interference from the stationary mold part 30 and a mold position (see FIG. 15) in which the float plate 42 is disposed over the stationary mold part 30 and the fabric 16 can be enclosed within the mold 12. Referring now to FIG. 4, the float plate 42 is somewhat "+"-shaped and defines a central opening 41 adapted to fit around the stationary mold part 30 (or alternatively the movable mold part 32) when the float plate 42 is in the mold position. The float plate 42 further includes a plurality of slide channels 48 (or bearing rails) to slidably receive the slide assemblies 40a-d (see FIG. 2). The channels 48 may be separately fabricated and attached to the float plate 42 or they may be integrally formed with the float plate 42, for example, by machining. The illustrated embodiment includes four pairs of slide channels 48 configured to receive the four slide assemblies 40a-d. The float plate 42 also include four cylinder brackets 50a-d for mounting the pistons 52a-d of stretch cylinders 46a-d (see FIG. 2) to the float plate 42, as described in more detail below. In the illustrated embodiment, the cylinder brackets 50a-d are machined or otherwise formed in the float plate 42. The cylinder brackets 50a-d may alternatively be separately fabricated and attached to the float plate 42. The float plate 42 defines guide holes 100 that are fitted over the alignment rods 102 on the stationary mold part 30 (see FIG. 1). The alignment rods 102 support the float plate 42 in an essentially vertical position while at the same time permitting the float plate 42 to move horizontally between the stretch position and the mold position. A plurality of springs 104 (see e.g., FIG. 3) are disposed between the stationary mold part 30 and the float plate 42 to bias the float plate 42 away from the stationary mold part 30 in the stretch position. In operation, closing of the movable mold part 32 pushes the float plate 42 from the stretch position to the mold position. Further, opening of the movable mold part 32 allows the springs 104 to return the float plate 42 to the stretch position. In an alternative embodiment (not shown), the float plate may be held stationary (rather than the stationary mold part 30) and the two mold parts may be movable to close on opposite sides of the fabric. In another alternative embodiment, the float plate may be eliminated altogether and the stretch assembly 14 may be mounted to a mold part.

Figure 5A:
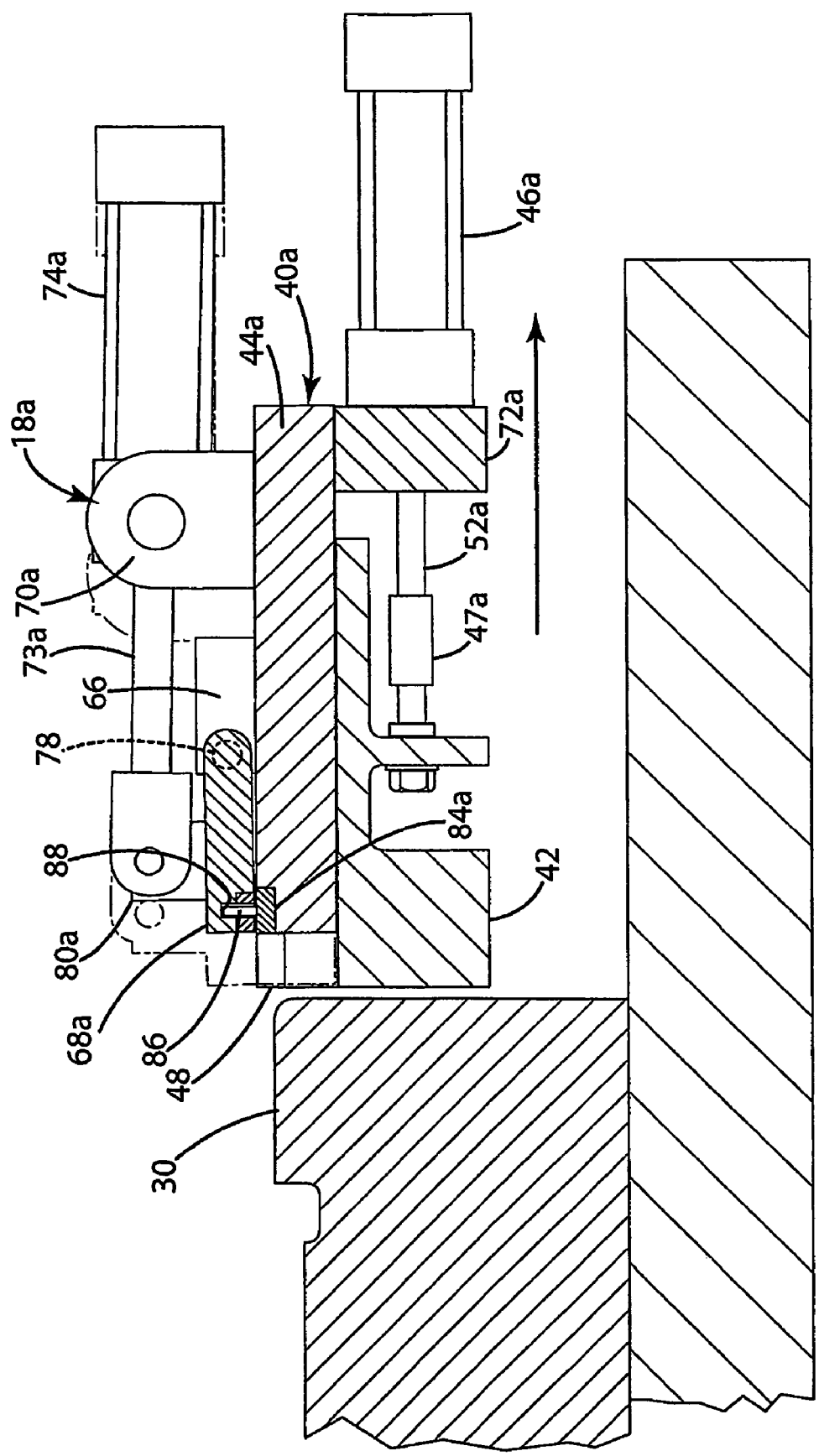
FIG. 5A is a sectional view of a portion of the stretching assembly showing the top slide assembly in two positions.

The slide assemblies 40*a-d* are mounted to the float plate 42 for reciprocating motion toward and away from the mold 12 in a direction roughly parallel to the face of the stationary mold part 30 (compare the solid and phantom lines of FIG. 5A). In the illustrated embodiment shown in FIG. 1, the stretching assembly 14 is intended to stretch the fabric 16 one amount in the vertical direction and a different amount in the horizontal direction. Accordingly, the stretching assembly 14 includes a top slide assembly 40*a* and a bottom slide assembly 40*b* that cooperate to provide the vertical stretch, and a left slide assembly 40*c* and a right slide assembly 40*d* that cooperate to provide the horizontal stretch. The number and location of the slide assemblies 40 may, however, vary from application to application depending primarily on the shape of the blank and the desired stretch profile. The slide assemblies 40*a-d* and clamp assemblies 18*a-d* will be described in more detail with reference to FIG. 5A and 5B, which show a sectional view of the top slide assembly 40*a* and top clamp assembly 18*a*. The bottom, left and right slide assemblies 40*b* -*d* and clamp assemblies 18*b-d* are generally identical in construction to the top slide assembly 40*a* and top clamp assembly 18*a*. Like components in the different slide and clamp assemblies share essentially identical reference numerals that vary only in a letter suffix. More specifically, the components of the top slide and clamp assemblies are designated with the suffix "a," the components of the bottom slide and clamp assemblies are designated with the suffix "b," the components of the left slide and clamp assemblies are designated with the suffix "c," and the components of the right slide and clamp assemblies are designated with the suffix "d." The slide assembly 40*a* generally includes a substantially planar slide 44*a* that is movably mounted to the float plate 42 in the corresponding channels 48, as well as a pneumatic stretch cylinder 46*a* that interconnects the float plate 42 and the slide 44*a* Operation of the stretch cylinder 46*a* causes movement of the slide 44*a* with respect to the float plate 42. The stretch cylinder 46*a* is a generally conventional locking pneumatic cylinder having a piston rod that can be locked in a given position. Although this embodiment includes a pneumatic cylinder, the invention may alternatively include a hydraulic cylinder or other conventional mechanism. If desired, a linear transducer (not shown) can be connected between the slide 44*a* and the float plate 42 to permit the control system (not shown) to monitor the position of the slides 44*a*. The linear transducer (not shown) may be integrated into the stretch cylinder 46*a* or may be a separate component. A strain gauge 47*a* may be interposed between the piston rod 52*a* of the stretch cylinder 46*a* and the float plate 42 so that the strain gauge 47*a* can monitor the resistance of the fabric 16 to the stretching action. The slide 44*a* generally includes a stretch cylinder bracket 72*a* for mounting the stretch cylinder 46*a* to the slide 44*a*, a plurality of head brackets 66 for pivotally mounting the clamp head 68*a* to the slide 44*a* and a clamp cylinder bracket 70*a* for pivotally mounting the clamp cylinder 74*a* to the slide 44*a*. The slide 44*a* may further include a polyurethane jaw 84*a* intended to interact with the clamp head 68*a* to grip the fabric 16. The top 40*a* and bottom 40*b* slide assemblies also include a plurality of fabric pins 86 adapted to receive the fabric 16 as described in more detail below.

Figure 5B:
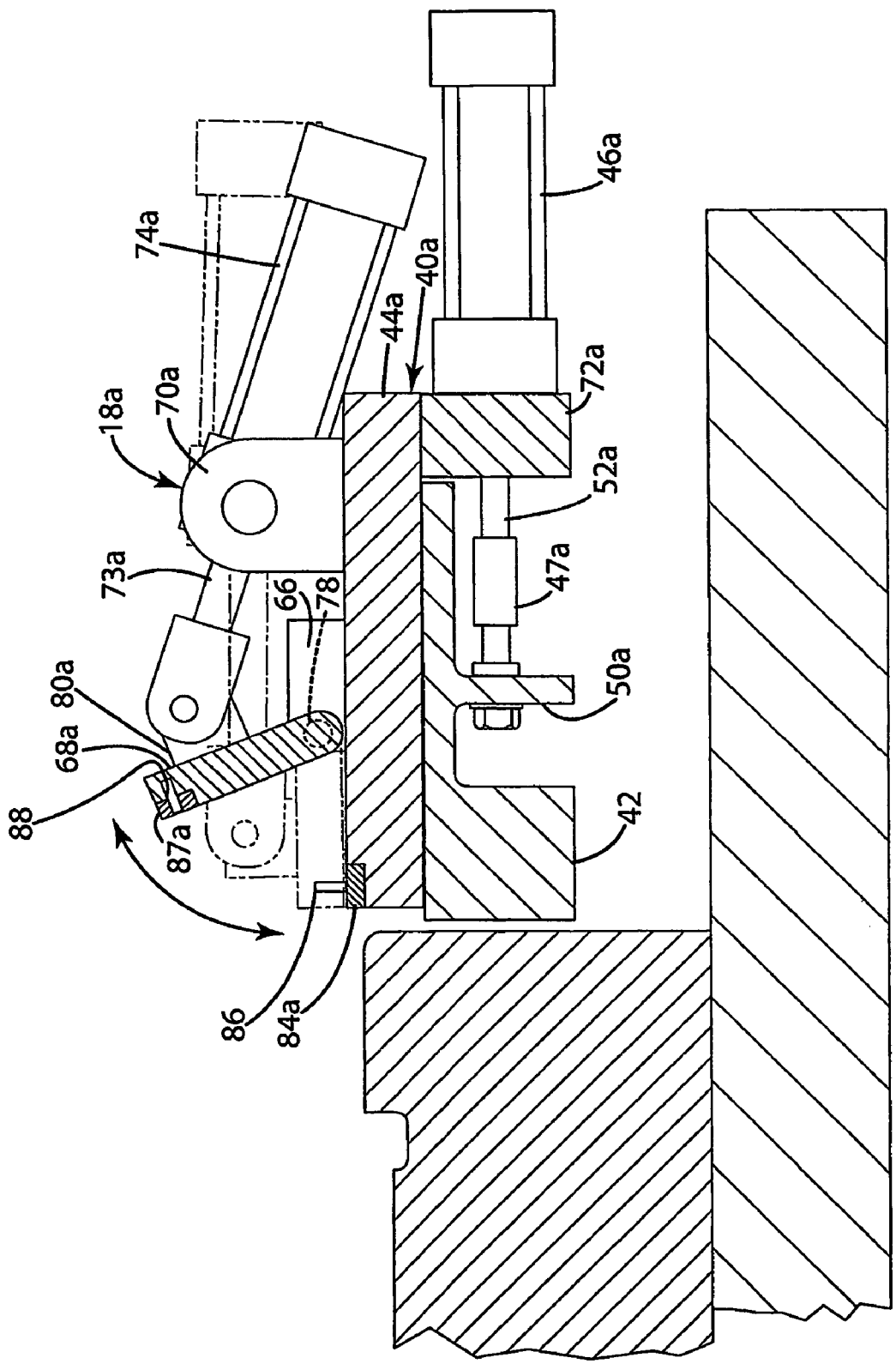
FIG. 5B is a sectional view of a portion of the stretching assembly showing the top clamp assembly in two positions.

One or more clamp assemblies 18*a-d* may be mounted to each slide 44*a-d*. In the illustrated embodiment, the stretching assembly 14 includes a top clamp assembly 18*a*, a bottom clamp assembly 18*b*, a left clamp assembly 18*c* and a right clamp assembly 18*d*. The number and location of the clamp assemblies may, however, vary from application to application depending primarily on the shape of the fabric and the desired stretch profile. As shown in FIG. 5B, each clamp assembly 18*a-d* generally includes a clamp head 68*a* that is pivotally mounted to the slide 44*a* and a clamp head cylinder 74*a* that is interconnected between the clamp head 68*a* and the slide 44*a* The clamp head 68*a* is generally planar and is pivotally connected to the head brackets 66 along one longitudinal edge by a rod 78. The clamp head 68*a* is configured to close against the polyurethane jaw 84*a* and may include a knurled steel insert 87*a* configured to engage the jaw 84*a* when closed. The clamp heads 68*a* and 68*b* of the top and bottom clamp assemblies 18*a* and 18*b* each define a plurality of holes 88 adapted to fit over the corresponding fabric pins 86 when the clamps heads 68*a* and 68*b* are closed. The clamp head 68*a* also includes a drive block 80*a* that protrudes from the remainder of the head 68*a* in a generally perpendicular direction. The drive block 80*a* is configured to function as a clevis to receive the free end of the piston rod 73*a* of the clamp cylinder 74*a*. The clamp cylinder 74*a* is pivotally mounted to the clamp cylinder bracket 70*a* so that it is free to pivot during operation of the clamp head 68*a*. If desired, a linear transducer (not shown) or other position sensing device can be mounted to the clamp cylinder 74*a* to permit the control system (not shown) to monitor the position of the clamp head 68*a*. For example, the linear transducer body (not shown) may be mounted to the clamp cylinder 74*a* with its shaft extending through a corresponding transducer ring mounted to the end of the piston rod 73*a*. In this way, relative movement between the body of the clamp cylinder 74 and the end of the piston rod 73*a* can be measured by linear transducer. The control system (not shown) can use this information to monitor the position of the clamp assembly 40, primarily as a failsafe.

Figure 10:
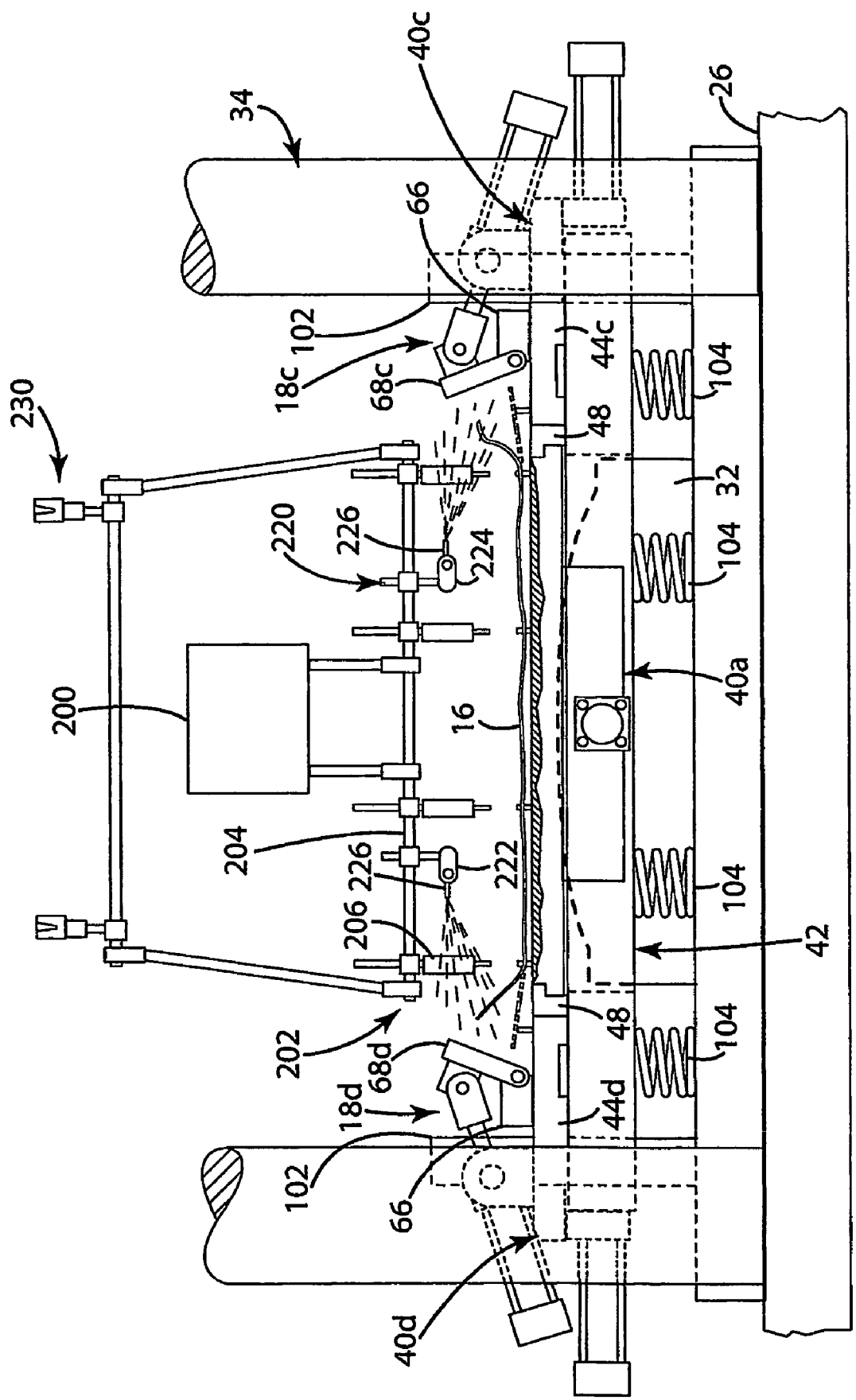
FIG. 10 is a top plan view of a portion of the molding apparatus showing the edges of the fabric curled in solid lines and straightened by the air knife assembly in phantom lines.

The molding apparatus 10 may also include a robot (not shown) with a robot arm 200 (FIG. 6) for moving the fabric 16 into and out of the mold 12. The robot and robot arm 200 are generally conventional and are therefore not described in detail. In this embodiment, the molding apparatus 10 includes a placing tool 202 located at the end of the robot arm 200. The end-of-arm placing tool 202 is adapted to receive the fabric 16, carry the fabric 16 as the robot arm 200 moves the tool 202 from a fabric loading station to the stretching assembly 14 and transfer the fabric 16 onto the fabric pins 86 of the stretching assembly 14. In the illustrated embodiment, the placing tool 202 includes a frame 204 supporting four top shot pins 206 and four bottom shot pins 206 that cooperate to carry the fabric 16 to the stretching assembly 14 and then to move the fabric 16 onto the fabric pins 86. The various shot pins 206 are arranged to align with the fabric pins 86 when the robot arm 200 is in a position to unload the fabric 16 onto the stretching assembly 14 (see FIGS. 7, 9 and 10). Each shot pin 206 includes a retractable transfer pin 210 and an outer sleeve 212. The retractable pins 210 are movably operable (such as, for example, pneumatically operable) between an extended position (see FIG. 8) to receive the fabric 16 and a retracted position (see FIG. 9) for moving the fabric 16 onto the fabric pins 86. In this embodiment, the transfer pins 210 retract mechanically as the robot arm 200 moves into the fabric pins 86. The transfer pins 210 may alternatively be retracted pneumatically by other mechanisms. As the robot arm 200 moves the placing tool 202 toward the fabric pins 86, the transfer pins 210 retract as a result of engagement with the fabric pins 86 so that the transfer pins 210 and fabric pins 86 remain in tip-to-tip contact. In those applications where the transfer pins 210 are actively retracted, the timing of the retraction of the transfer pins 210 and the advancement of the robot arm 200 are controlled by the control system (not shown) in a conventional manner. As a result of this action, the fabric 16 is pushed off of the transfer pins 210 and onto the corresponding fabric pins 86 by the outer sleeves 212. To facilitate alignment, the end of each transfer pin 210 may be concave and the end of each fabric pins 86 may be rounded, or vice versa, so that the tips can be somewhat interfitted. Alternatively, the transfer pins 210 may include a hollow tip that is fitted over a portion of the fabric pins 86 to facilitate fabric transfer. As an example of this alternative construction, each of the transfer pins 210 may have a substantially larger diameter than the corresponding fabric pins 86 and each may define an end bore (not shown) dimensioned to be fitted over the corresponding fabric pins 86. Although the depth may vary, the end bore (not shown) may be approximately one-quarter inch or so in depth so that there is a substantial telescopic overlap between the fabric pins 86 and transfer pins 210. The robot arm 200 may also include an air knife assembly 220 (FIG. 10) to straighten the fabric 16 for clamping. The air knife assembly 220 includes a left nozzle array 222 and a right nozzle array 224, each mounted to the frame 204. Each nozzle array 222 and 224 includes a plurality of nozzles 226 that cooperatively direct pressurized air in the left and right directions. The air knife assembly 220 is connected to a supply of pressurized air (not shown) and includes a conventional valve (not shown) that permits the control system (not shown) to selectively operate the air knife assembly 220. In use, the left and right walls of air push the fabric 16 against the slides 44 of the left and right clamp assemblies (see FIG. 10). The air removes any unwanted curling of the fabric 16 that might otherwise impair the ability of the clamp assemblies to close on the fabric 16.

Although not shown in detail, the robot arm 200 may also carry a picking tool 230 for removing the fabric 16 and molded component 20 from the movable mold part 32 after the molding process. The picking tool 230 is generally conventional and therefore will not be described in detail. Suffice it to say that the picking tool 230 may be mounted to the end of the robot arm 200 on the side opposite the placing tool 202, and may be configured to grab one or more sprues, runners or other parts of the completed component (see FIG. 16). Once grasped by the picking tool 230, the robot arm 200 shuttles the finished product back to the fabric loading station where it can be removed by the operator.

Figure 6:
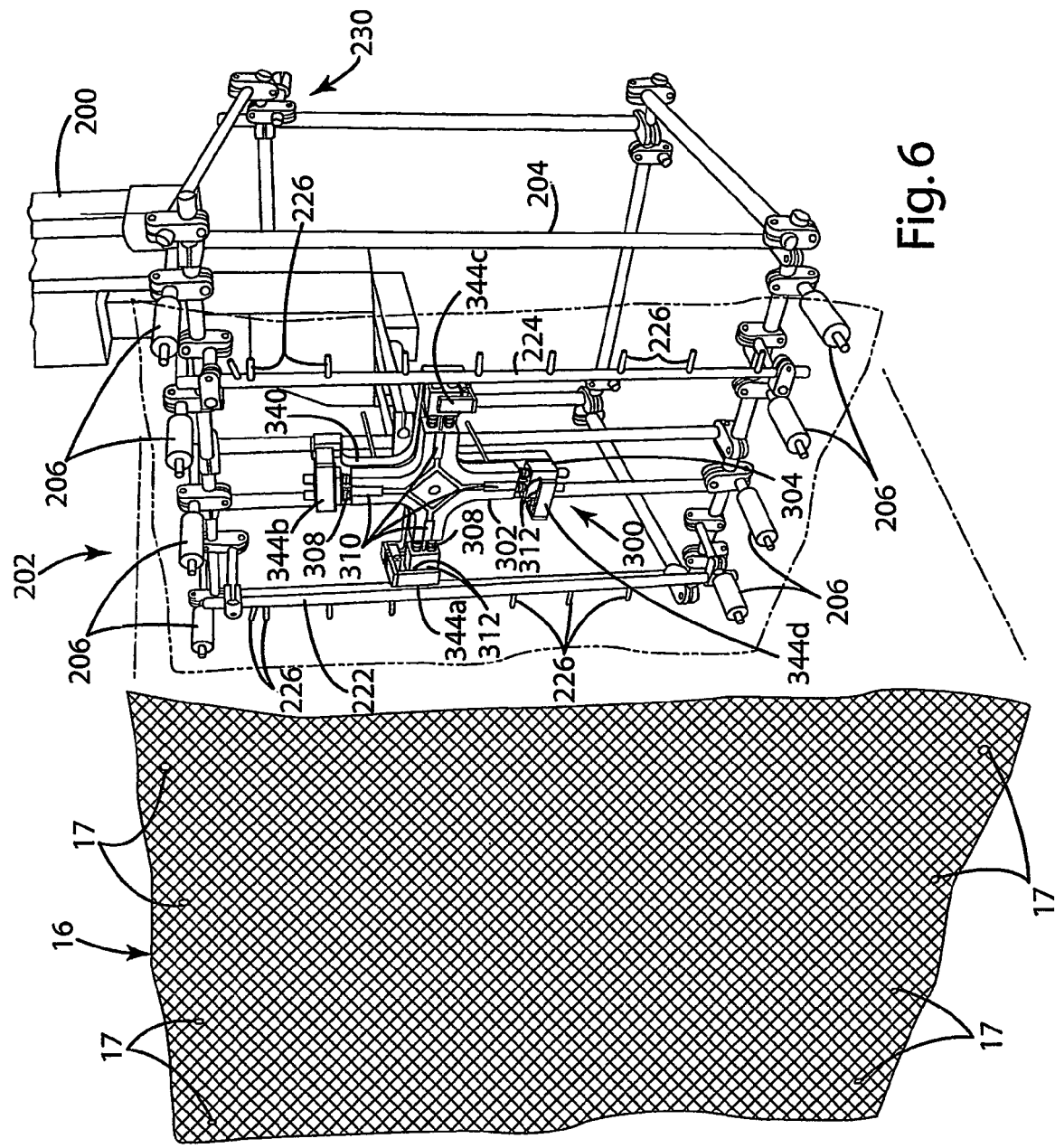
FIG. 6 is a perspective view of the robot end-of-arm tooling.
Figure 7:
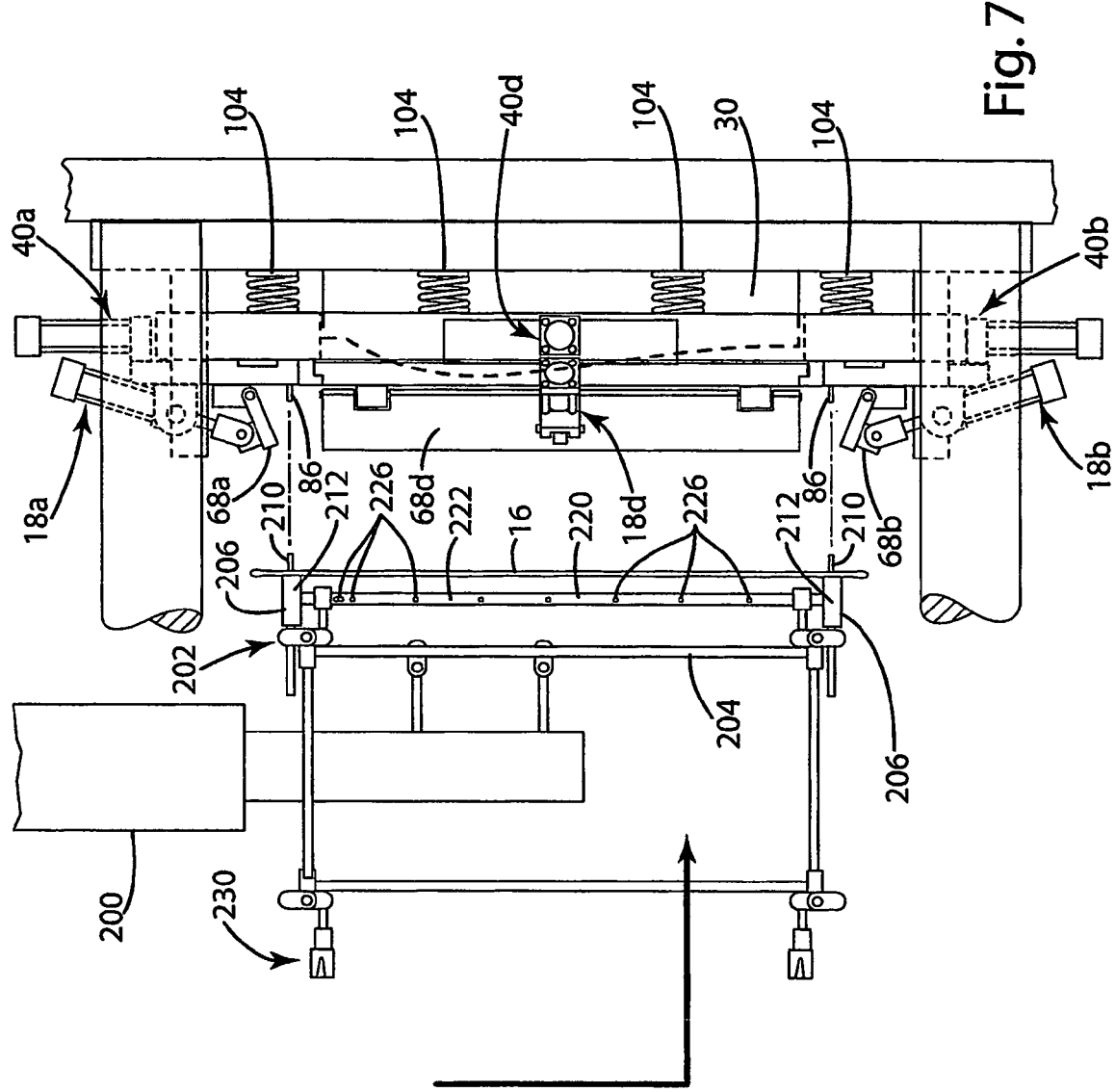
FIG. 7 is a side elevational view of robot arm and placing tool adjacent to the stationary mold part.
Figure 11:
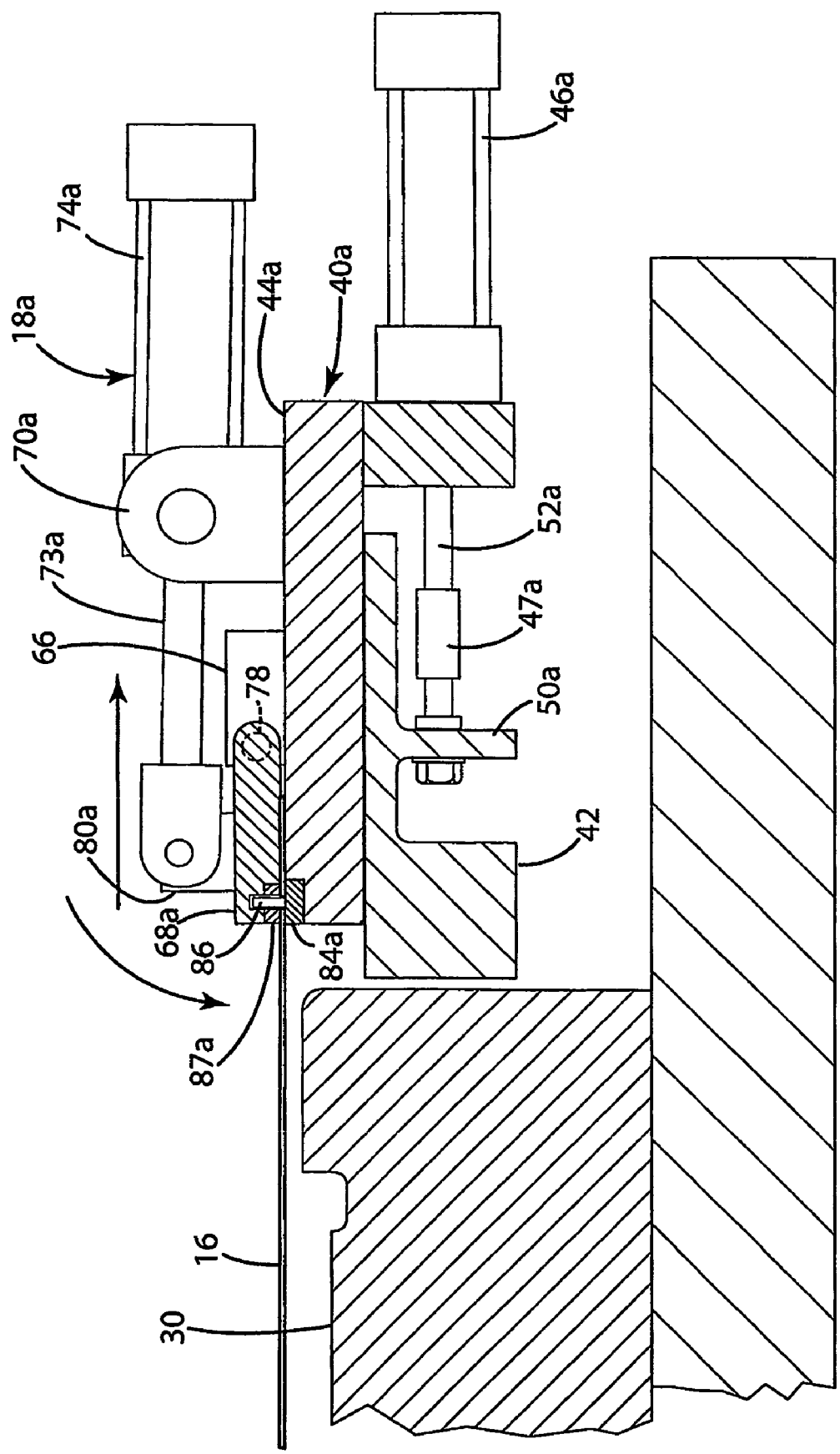
FIG. 11 is a sectional view showing the stretched fabric in the mold.
Figure 12:
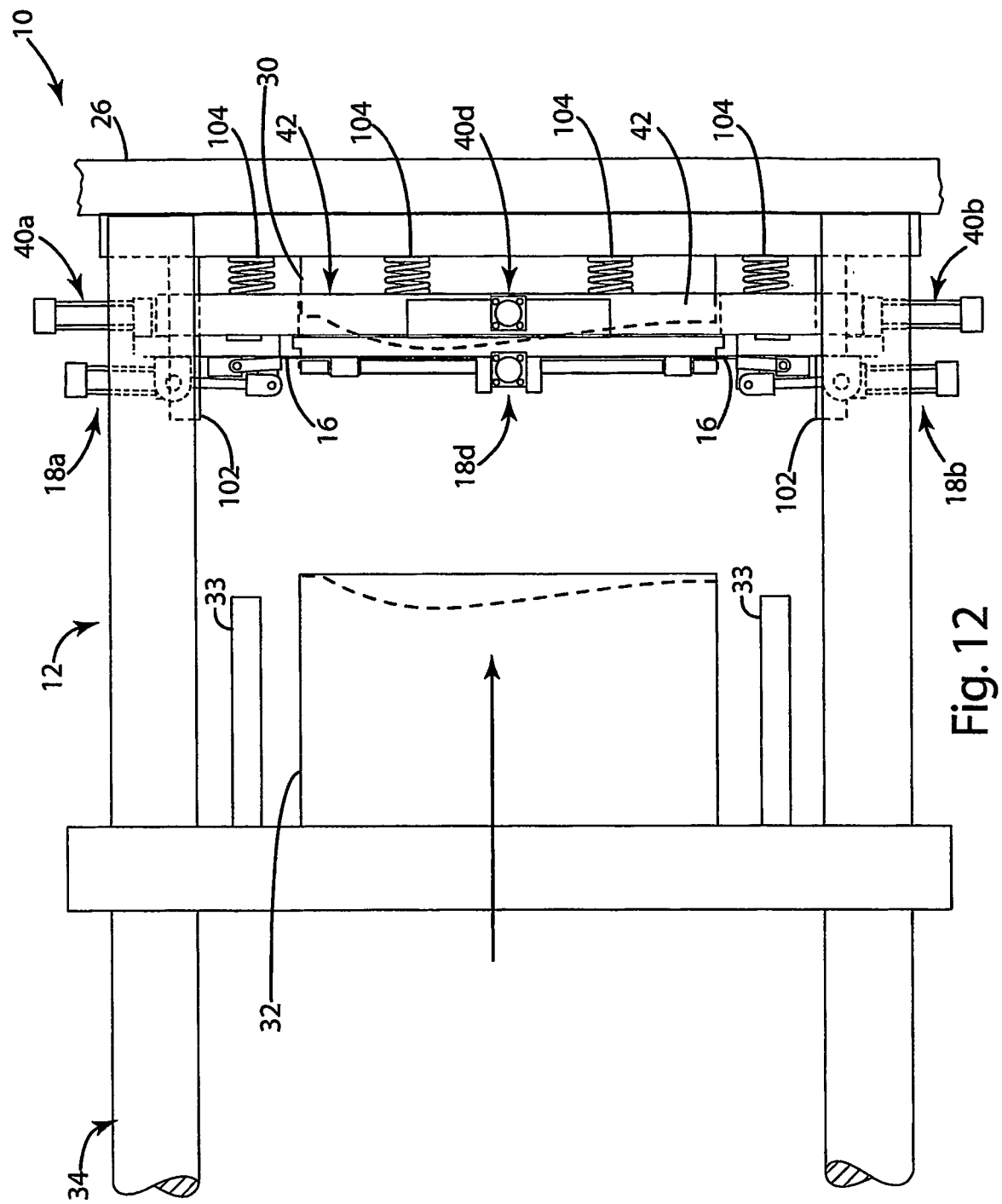
FIG. 12 is a side elevational view of the molding apparatus showing the movable mold base closing on the stationary mold.

In operation, the process begins by loading a segment of fabric 16 onto the shot pins 206 of the placing tool 204. With reference to FIG. 6, the fabric 16 is pre-cut to the desired shape and defines a plurality of mounting holes 17 adapted to be fitted over the retractable pins 210. FIG. 6 provides only a representation of the fabric 16 and is not intended to accurately illustrate the weave of the fabric. In many applications, the strands of the fabric will be of a significantly tighter weave than shown in the figures and will include a weave of horizontally extending strands and vertically extending strands. The present invention is not limited for use with fabrics, but is also well suited for use with other stretchable blanks. For example, the present invention may be used with an elastic membrane. In the illustrated embodiment, the fabric 16 is manually loaded by fitting the pre-cut holes 17 over the corresponding transfer pins 210. Although the illustrated embodiment includes shot pins 206 only along the top and bottom of the fabric 16, additional shot pins 206 may be added in other locations, for example, along the left and right edges. The robot arm 200 then moves the fabric 16 to the stretching assembly 14 (see FIG. 7). The robot arm 200 is then positioned such that the retractable pins 210 are aligned with the fabric pins 86 tip-to-tip. In those embodiments where the retractable pins 210 are configured to be fitted over the fabric pins 86, the robot arm 200 may be positioned so that the retractable pins 210 are telescopically fitted over the fabric pins 86. The robot arm 200 is then moved inwardly toward the fabric pins 86. Simultaneously, the pneumatic pressure in the retractable pins 210 is released allowing the retractable pins 210 to be pushed back into the sleeves 212 at the same rate as the robot arm 200 is moved inwardly. This action continues until the fabric pins 86 have moved into the sleeves 212 and the sleeves 212 have in effect pushed the fabric 16 off of the retractable pins 210 and onto the fabric pins 86 (see FIG. 9). The air knife assembly 220 is then operated to blow the fabric 16 down against the face of the jaws 84 on the left and right clamp assembles 18c and 18d (see FIG. 10). While the air knife assembly 220 is operating, the left and right clamp assemblies 18c-d are closed roughly ninety percent or so. As a result, the left and right clamp assemblies 18c-d prevent the fabric 16 from re-curling once the air knife assembly 220 is disengaged, but do not pinch the fabric, which could interfere with the vertical stretch. The robot arm 200 is then moved away from the mold 12 a sufficient distance so that the top and bottom clamp assemblies 18a-b may close on the fabric 16. In this embodiment, the vertical and horizontal stretching are done separately. First, the vertical stretch is applied to the fabric 16 using the top and bottom clamp assemblies 18a-b. Although the vertical stretch is applied first in the described embodiment, the horizontal stretch may be applied first or the horizontal and vertical stretch may be applied simultaneously. The top and bottom clamp assemblies 18a-b are closed onto the top and bottom edges of the fabric 16. More specifically, the clamp cylinders 74a-b of the top and bottom clamp assemblies 18a-b are extended to pivot the corresponding clamp heads 68a-b onto the top and bottom peripheral edge of the fabric 16. The fabric 16 is gripped between the polyurethane jaw 84a-b on the slide 44a-b and the knurled steel insert 86a-b in the clamp head 68a-b. As the clamp heads 68a-b close, the fabric pins 86 fit into the holes 88 in the clamp head 68a-b so that they do not interfere with the clamp head 68a-b closing. The top and bottom side assemblies 40a-b are then moved away from one another to apply the desired stretch to the fabric 16. A portion of the molding apparatus 10 is illustrated in FIG. 11 showing the top clamp assembly 18a closed and the top slide assembly 40a extended to apply stretch to the fabric 16. The amount of movement of the slide assemblies 40a-b can be based on a predetermined distance (e.g. using feedback from the linear transducers) or based on the tension in the fabric (e.g. using the strain gauges 47a-b disposed between the slides 44a-b and the float plate 42) or based on time (e.g. extend the stretch cylinders 46a-b for a specific amount of time). Next, the horizontal stretch is applied. As noted above, the left and right clamp assemblies 18c and 18d may already be closed roughly ninety percent. In applications where they are partially closed, the left and right clamp assemblies 18c and 18d are fully closed onto the left and right edges of the fabric 16 while the fabric 16 remains under the vertical stretch. If desired, the left and right clamp assemblies 18c and 18d need not be closed after the vertical stretch has been applied. Rather, the left and right clamp assemblies 18c and 18d may be previously closed, for example, at the same time as the top and bottom clamp assembles 18a and 18b are closed. Consideration should be given, however, to the impact that the closed left and right clamp assemblies 18c and 18d may have on the vertical stretch. The left and right clamp assemblies 18c and 18d are closed in essentially the same manner as the top and bottom clamp assemblies 18a and 18b described above. Once closed, the left and right slide assemblies 40c and 40d are operated to apply the desired stretch to the fabric 16. As with the vertical stretch, the amount of horizontal stretch can be based on the distance of movement of the slides 44c -d, the tension in the fabric or the amount of time of movement of the slides 44c-d. In this embodiment, the air knife assembly 220 functions to address curling on the left and right sides of the fabric 16 and is disengaged once the left and right clamp assemblies 18c and 18d have been partially closed. In other applications, the air knife assembly 220 may be configured to address curling in other locations on the fabric or the air knife assembly 220 may be eliminated. FIG. 12 shows the molding apparatus with the fabric 16 stretched and held within the stretch assembly 14. As described, the illustrated embodiment includes a pair of opposed slide assemblies 40a-b and 40c-d that stretch the fabric 16 in opposite directions. In some applications, one or more of the slide assemblies 40a-d can be eliminated. For example, in one alternative, the top slide assembly 40a can be eliminated and the top clamp assembly 18a can be mounted directly to the float plate 42. In this embodiment, the bottom slide assembly 40d moves to apply the vertical stretch to the fabric 16. Similarly, either the left or right slide assembly 40c-d may be eliminated with the left or right clamp assembly 18c-d being mounted directly to the float plate 42.

Figure 13:
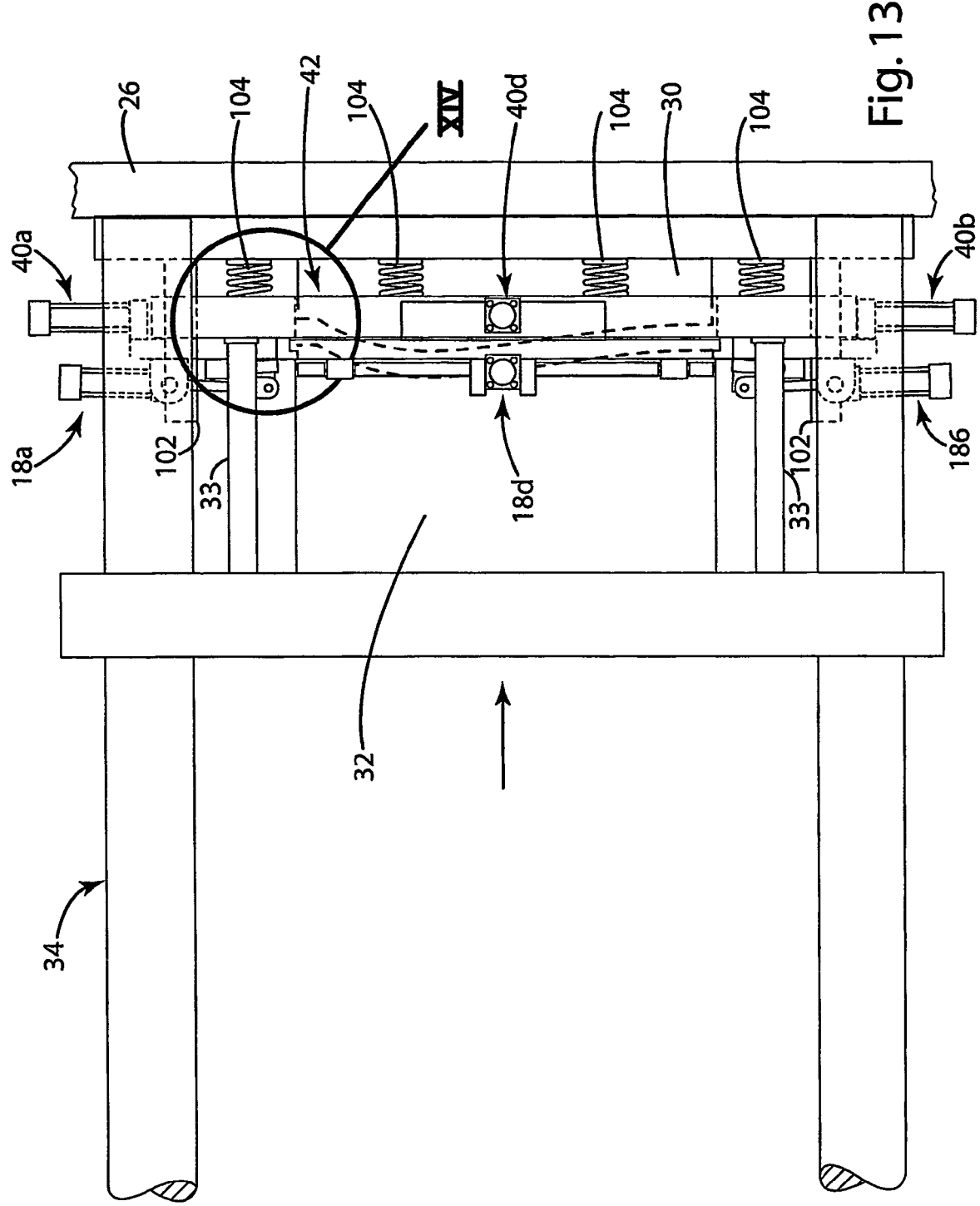
FIG. 13 is a side elevational view of the molding apparatus showing the movable mold base closed on the stationary mold.
Figure 14:
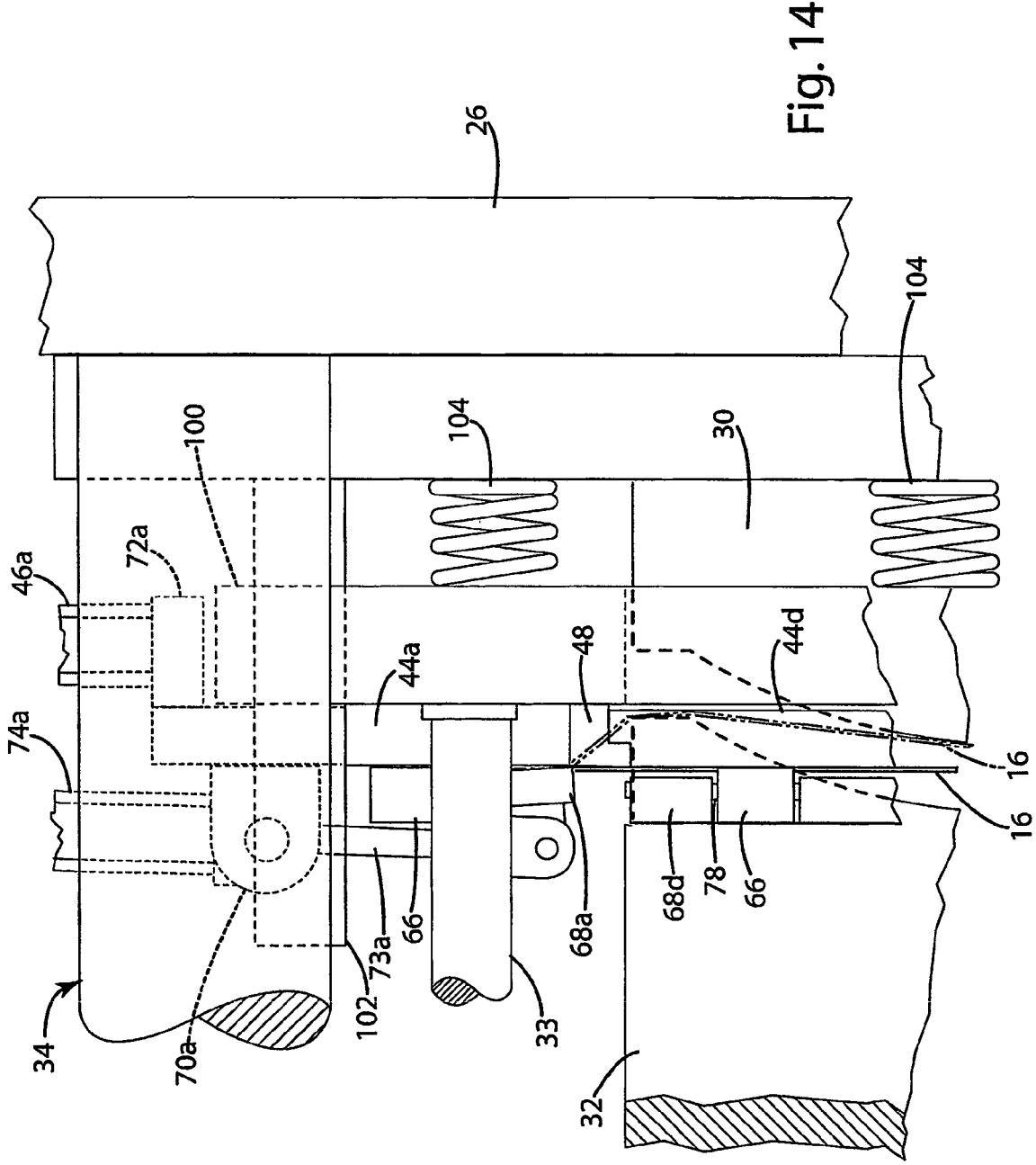
FIG. 14 is an enlarged sectional view of a portion of the molding apparatus showing the float plate in the stretch position.

Once the fabric 16 is stretched, the movable mold part 32 is closed onto the stationary mold part 30. In the illustrated embodiment, the movable mold 32 is moved in a horizontal direction using a conventional horizontal press 34. As noted above, the closing action of the movable mold part 32 causes the float plate 42 to move into the mold position (see FIG. 15). More specifically, the movable mold part 32 includes a plurality of rams 33 that engage the float plate 42 (see FIG. 13) and move it against the bias applied by springs 104 (Compare FIGS. 14 and 15). This movement of the float plate 42 over the stationary mold part 30 permits the two mold parts 30 and 32 to close about the fabric 16. As noted above, the two mold parts 30 and 32 cooperatively define a mold cavity (not shown) in the shape of the desired component. Molten material is injected into the mold cavity in a conventional manner. In this embodiment, the molten material is injected into the mold cavity via sprues/runners in the movable mold part 32. The molten material flows through and fills the mold cavity to encapsulate the fabric 16. Once the molten material is sufficiently cool, the mold parts 30 and 32 are opened. More specifically, the clamp assemblies 18a-d are opened and the movable mold part 32 is moved horizontally away from the stationary mold part 30 by the horizontal press 34. As the movable mold part 32 moves away from the stationary mold part 30, the springs 104 move the float plate 42 away from the stationary mold part 30. The sprues/runners (not shown) in the movable mold part 32 are configured to define conventional "sucker" pins (not shown) that mechanically intersecure the molded part and the movable mold part 32. Because of the interconnection created by the sucker pins (not shown), the fabric 16 and integrally molded component remain on the movable mold part 32 during this portion of the mold opening process. As a result, the molded part remains on the movable mold part 32 and continued horizontal movement of the movable mold part 32 carries the molded part away from the float plate 42. The movable mold part 32 is moved a sufficient distance from the stationary mold part 30 for the part to be removed by the robot arm 200. The robot arm 200 is moved into a position adjacent to the movable mold part 32 and the component 20 is grasped by the picking tool 230 (see FIG. 16). Once the fabric 16 and attached molded component 20 are in the picking tool 230, the robot arm 200 shuttles the assembly back to the loading station where it can be removed by the operator.

Figure 17A:
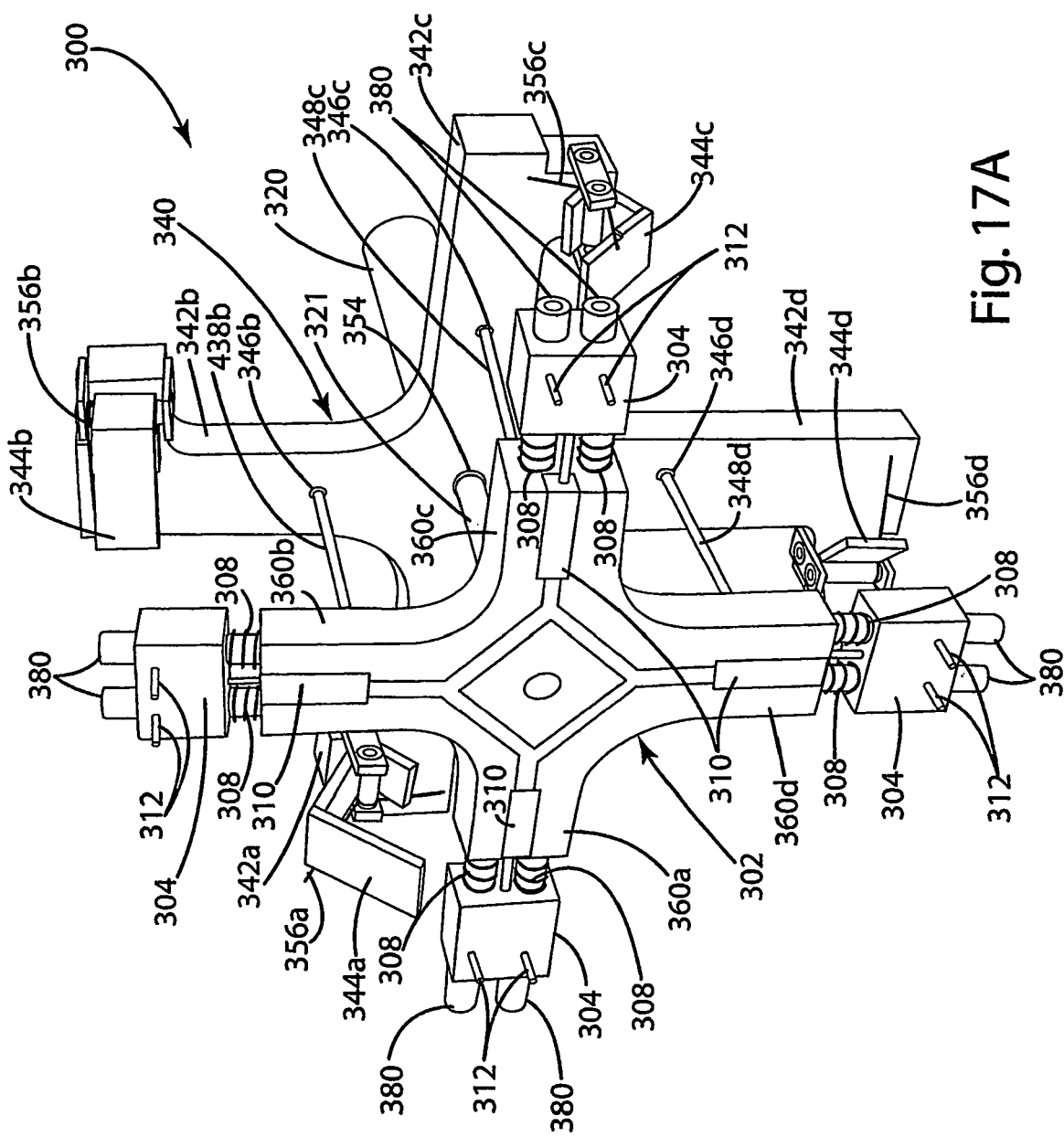
FIG. 17A is a perspective view of the stretch measuring tool in the extended position.
Figure 17B:
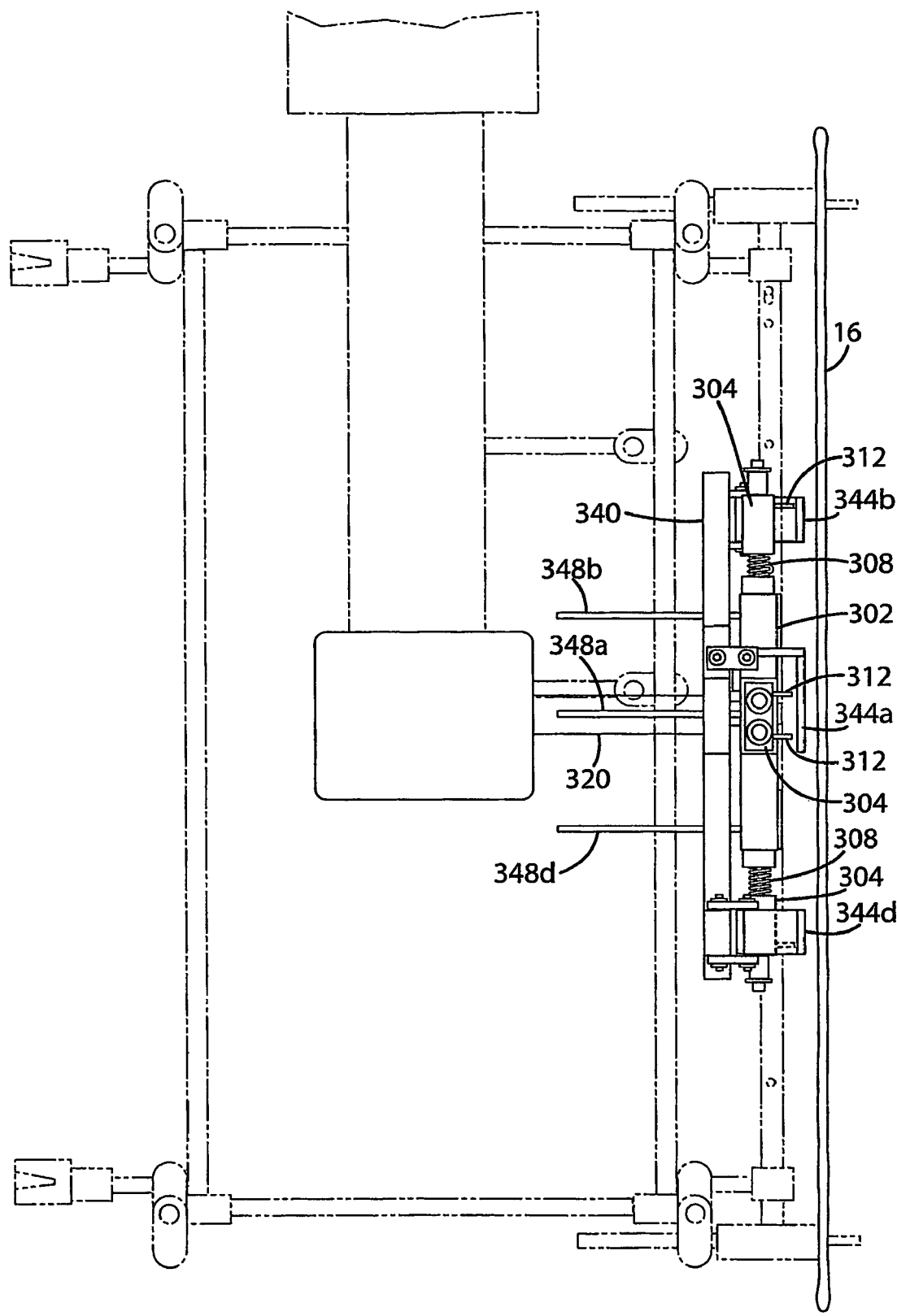
FIG. 17B is a side elevational view of the end-of-Ann tooling showing the stretch measuring tool in the retracted position.
Figure 17C:
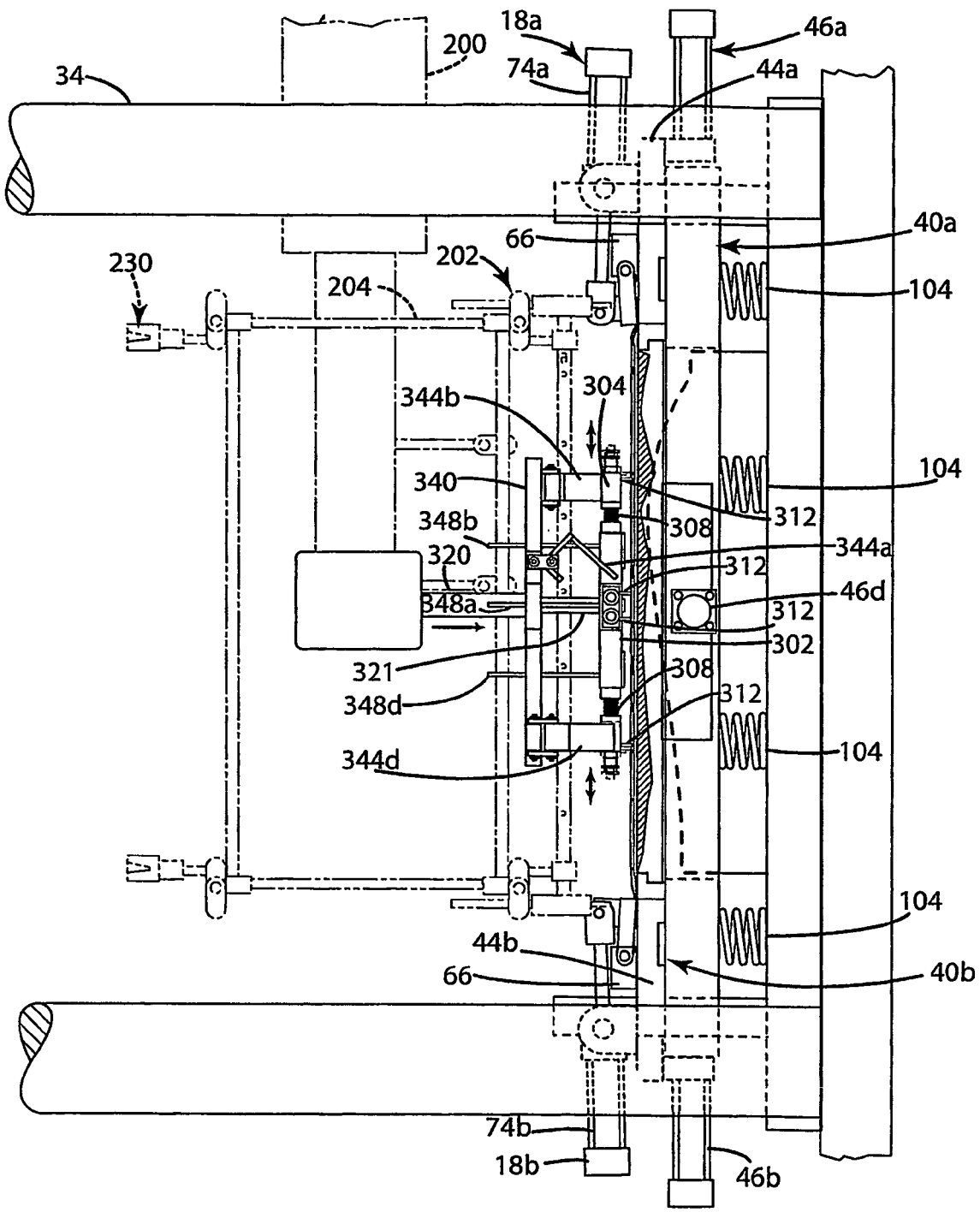
FIG. 17C is a side elevational view of a portion of the molding apparatus showing the stretch measuring tool in the extended position and engaged with the fabric.
Figure 18A:
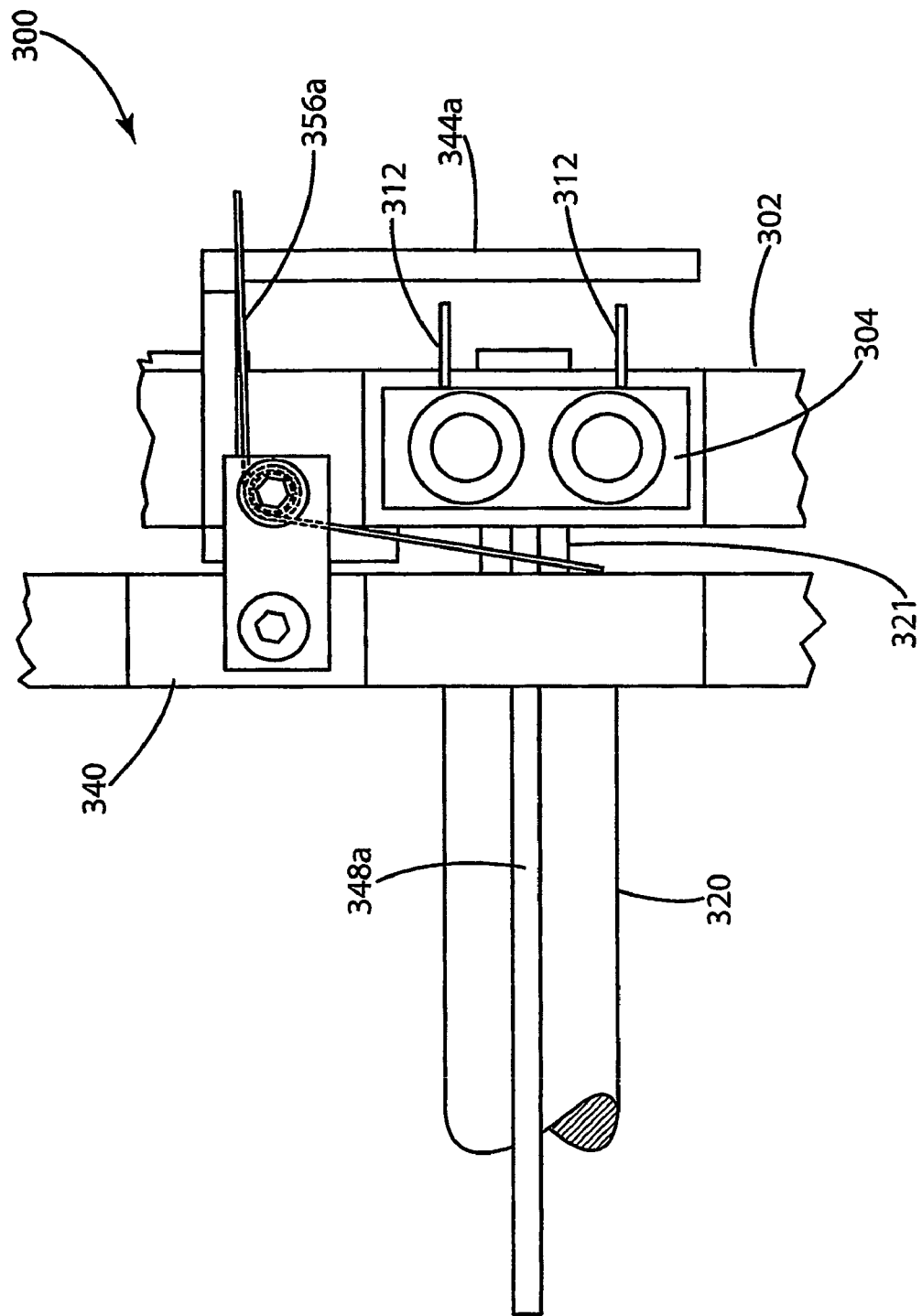
FIG. 18A is an enlarged side elevational view of a portion of the stretch measuring tool showing the needle guard in the closed position.
Figure 18B:
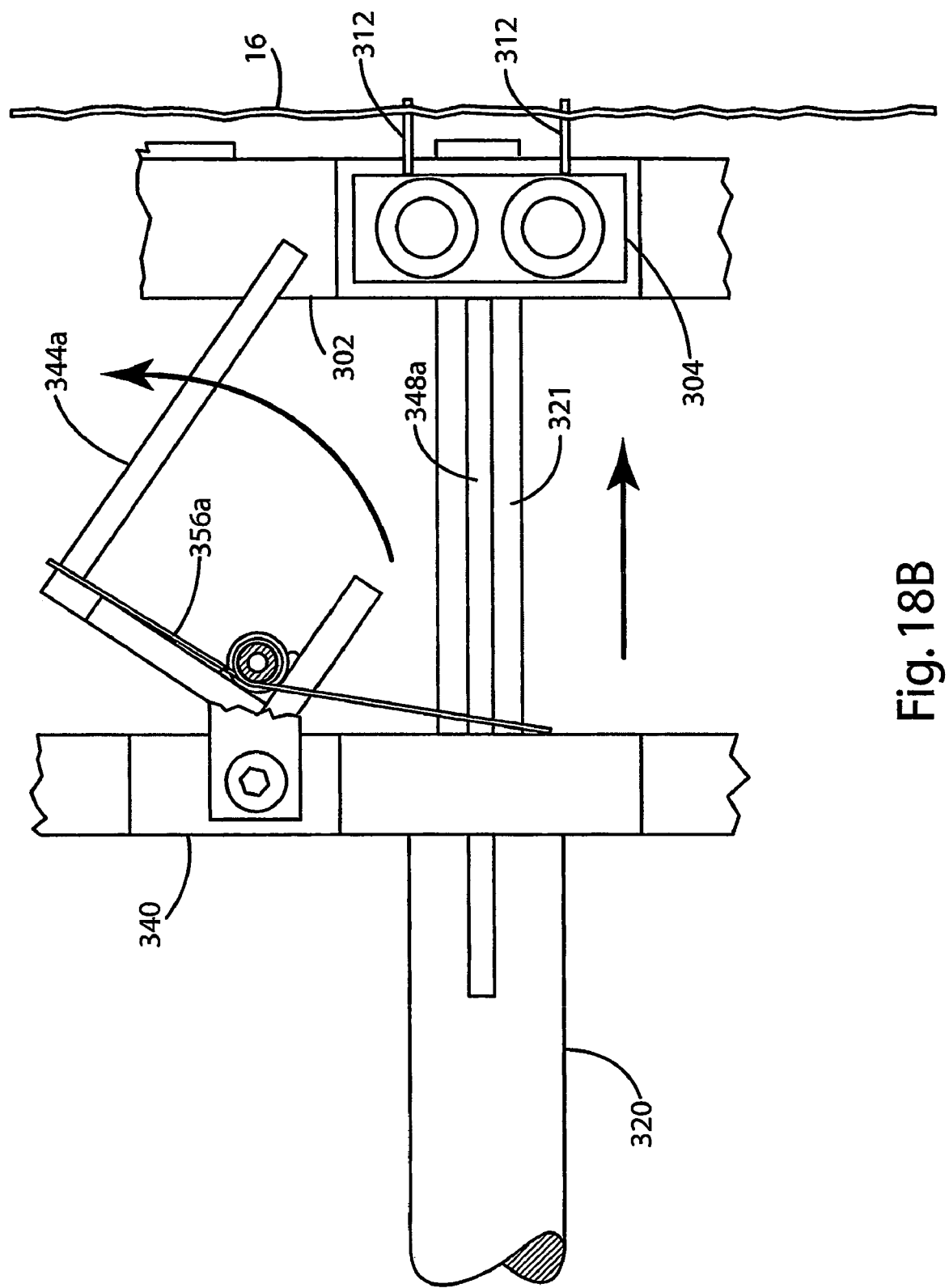
FIG. 18B is an enlarged side elevational view of a portion of the stretch measuring tool showing the needle guard in the opened position.

In one embodiment, the molding apparatus 10 also includes a stretch measuring tool 300 (see FIGS. 6 and 17A) for evaluating the accuracy of the stretch of the fabric 16. In this embodiment, the stretch measuring tool 300 is mounted to the end of the robot arm 200 within the frame 204 of the placing tool 202. The stretch measuring tool 300 may be mounted to a pneumatic or hydraulic cylinder, such as cylinder 320, or to a linear actuator or other device capable of moving the stretch measuring tool 300 with respect to the frame 204 toward and away from the fabric 16 (compare FIGS. 17B and 17C). The cylinder 320 may be mounted directly or indirectly to the robot arm 200. The stretch measuring tool 300 generally includes a base 340, a frame 302 movably mounted to the base 340, a plurality of blocks 304 movably mounted to the frame 302 and a plurality of linear transducers 310 (see FIG. 17A) for monitoring movement of the blocks 304 with respect to the frame 302. In this embodiment, the base 340 is secured to the fixed portion of cylinder 320 so that it remains stationary during operation of the stretch measuring tool 300 and the frame 302 is secured to the piston rod 321 so that the frame 302 moves with respect to the base 340 as the cylinder 320 is extended and retracted. The base 340 is generally "+"-shaped having four arms 342a-d. The base 340 may have other shapes as desired. The base 340 defines a central opening 354 through which passes the piston rod 321 of the cylinder 320. The central opening 354 is of sufficient dimension to permit the piston rod 321 to move freely as the cylinder 320 operates. The base 340 includes a generally "U"-shaped needle guard 344a-d mounted to the end of each arm 342a-d. The needle guards 344a-d are pivotally mounted to the base 340 and each includes a spring 356a-d adapted to bias the needle guard 344a-d in an open position. The needle guards 344a-d functionally interact with the frame 302 to selectively cover the fabric needles 312, as described in more detail below. Each of the four arms 342a-d defines a guide hole 346a-d for slidably receiving a corresponding alignment rod 348a-d extending from the frame 302, as described in more detail below. The frame 302 is also generally "+"-shaped having four arms 360a-d that provide a support structure for the blocks 304. The frame 302 may have other shapes as desired. An alignment rod 348a-d is rigidly mounted to each of the arms 360a-d of the frame 302. The alignment rods 348a-d slidably extend through the guide holes 346a-d to shepherd movement of the frame 302 with respect to the base 340. A block 304 is movably mounted to the end of each arm of the frame 302. More specifically, each block 304 is slidably mounted for reciprocal movement over a pair of support rods 380 extending in the direction of the arms. The free end of each support rod 380 may be enlarged or include a nut or other stop mechanism to retain the blocks 304. A plurality of springs 308 may be mounted over the support rods 380 between the blocks 304 and the frame 302 to bias the blocks 304 in the outermost position. A separate linear transducer 310 is mounted between the frame 302 and each block 304 so that each transducer 310 produces signals indicative of the position of the corresponding block 304 on the support rods 380. The linear transducers 310 may alternatively be replaced by other sensing devices. Each of the blocks 304 includes a pair of fabric needles 312 that are arranged to penetrate the fabric 16 between the strands. The fabric needles 312 may be replaced by other components that may attach to the fabric 16. In operation, the stretch measure tool 300 is used to test the stretch of the fabric 16 after the fabric 16 has been stretched, preferably, a first time to remove any slack in the fabric and the like, and, preferably, before the mounting component or other member is molded to or about the fabric. In a preferred method, the following general steps can be followed: move the stretch measuring tool 300 toward the fabric 16 by operation of cylinder 320 so that the fabric needles 312 penetrate the fabric 16, move the slide assemblies 40a-d to their un-stretched positions so that all stretch is removed from the fabric 16 and monitor the signals generated by the linear transducers 310 as the fabric 16 shrinks back to its original size as the stretching force is removed. FIG. 17C shows the stretch measuring tool 300 after the stretched has been removed and the blocks 304 have been moved by the shrinking of the fabric 16. To illustrate the movement of the blocks 304, FIG. 17C also shows the original position of the blocks 304 in phantom lines. The information provided by the linear transducers 310 can be analyzed by the control system to determine whether the appropriate stretch is being applied to the fabric 16. After the measuring process is complete, the stretch measuring tool 300 is moved away from the fabric 16 until the fabric needles 312 are withdrawn from the fabric 16. Operation of the needle guards 344a-d is described in connection with FIGS. 18A and 18B. The needle guards 344a-d are configured to move between open and closed positions as the frame 302 is extended into and retracted from the fabric 16. When the stretch measuring tool 300 is in the retracted position, the frame 302 has engaged and is holding the needle guards 344a-d in the closed position (see FIG. 18A). In this position, the needle guards 344a-d cover the fabric needles 312 to reduce the risk of injury to the operator. As the stretch measuring tool 300 is extended, the frame 302 moves away from the base 340. As the frame 302 moves away from the base 340, the springs 356a-d pivot the needle guards 344a-d into the open position (see FIG. 18B). This permits the frame 302 to extend beyond the needle guards 344a-d. The needle guards 344a-d may engage a portion of the base 340 or a stop attached to the base to prevent them from over-rotating. The springs 356a-d hold the needle guards 344a-d in the proper position against the base 340 (or other stop) to receive the frame 302 when the stretch measuring tool 300 is again retracted. When the stretch measuring tool 300 is retracted, the frame 302 moves back into engagement with the needle guards 344a-d. As the stretch measuring tool 300 is further retracted, the frame 302 closes against the needle guards 344a-d pivoting them against the bias of the springs 356a-d back into the closed position. The fabric 16 can then be re-stretched for molding. Alternatively, the stretch measuring tool may be readily configured to engage and measure the fabric as it is being stretched, rather than as it is being released from its stretch.

Figure 19:
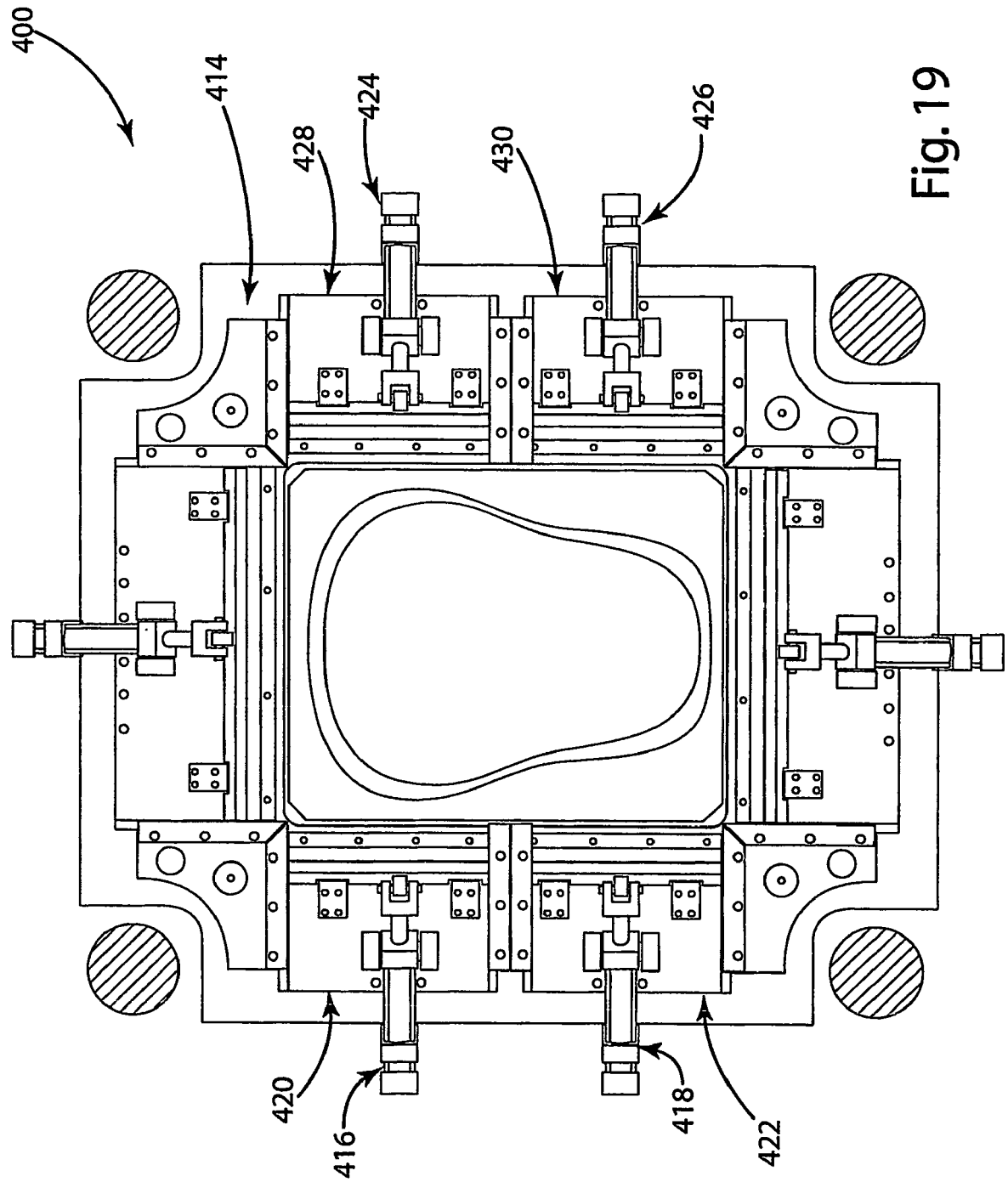
FIG. 19 is a front elevational view of a molding apparatus having an alternative stretching assembly.

In an alternative embodiment, the molding apparatus includes an alternative stretching assembly that has additional clamp assemblies and slide assemblies that permit the amount of stretch applied to the fabric in different locations to be varied. Except as described below, the components of the alternative molding apparatus are essentially identical to those of the embodiment described above and therefore will not be described. One embodiment of this alternative molding apparatus 400 is shown in FIG. 19. In this embodiment, the stretching assembly 414 is adapted to permit a different amount of horizontal stretch to be applied to the upper portion of the fabric than the lower portion of the fabric. As shown, the stretching assembly 414 includes upper 416 and lower 418 left clamp assemblies, upper 420 and lower 422 left slide assemblies, upper 424 and lower 426 right clamp assemblies and upper 428 and lower 430 right slide assemblies. The opposed upper clamp assemblies 416, 424 and opposed upper slide assemblies 420, 428 cooperate to apply horizontal stretch to the upper portion of the fabric (not shown) while opposed lower clamp assemblies 418, 426 and opposed lower slide assemblies 422, 430 cooperate to apply horizontal stretch to the lower portion of the fabric (not shown). In this embodiment, opposed lower slide assemblies 422, 430 can be moved apart a different distance than the opposed upper slide assemblies 420, 428 to provide a different stretch in the lower portion of the fabric. The use of different amounts of stretch in different portions of the fabric may be beneficial in a variety of applications. For example, in the context of a chair back, the lower portion of the fabric (not shown) can be stretched farther in the horizontal direction than the upper portion of the fabric to provide firmer support in the lumbar region of the chair back. In other applications, the number and location of the clamp assemblies and slide assemblies can vary as desired.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular. Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art Various features of the invention are set forth in the following claims.

The embodiments of the invention in which an exclusive property or privilege is claimed are defined as follows:

1. A mold apparatus for molding a component onto a stretched blank comprising:
   a first mold part;
   a second mold part;
   a stretching assembly disposed between said first mold part and said second mold part, said stretching assembly including a plurality of clamp assemblies operable to grip the periphery of the blank and hold the blank, said stretching assembly further including a plurality of slide assemblies for selectively moving said clamp assemblies to apply a stretch to the blank, said clamp assemblies and said slide assemblies positioned about the periphery of the blank to enable stretching the blank to a stretched condition in which the blank is stretched in both a first direction and in a second direction perpendicular to said first direction; and
   an apparatus for closing said first mold part and said second mold part on the blank while the blank is held in a stretched condition by said stretching assembly, wherein said stretching assembly includes a plate defining a central opening permitting said first mold part and said second mold part to close on the stretched fabric, said slide assemblies being movably mounted to said plate and said clamp assemblies operatively mounted to said slide assemblies, wherein said plate is movably mounted to said first mold part and is movable along a path between a stretch position and a mold position, wherein the direction of said path is generally perpendicular to said first direction and said second direction of said stretching of said blank, the apparatus further including biasing means for biasing said plate in said stretch position, wherein said biasing means is further defined as a plurality of springs disposed between said plate and said first mold part, wherein at least one of said slide assemblies includes a slide movably mounted to said plate and a stretch cylinder interconnected between said slide and said plate, whereby extension and retraction of said stretch cylinder results in movement of said slide with respect to said plate, wherein at least one of said clamp assemblies includes a clamp head pivotally mounted to one of said slides and a clamp cylinder interconnected between said clamp head and said slide, wherein extension and retraction of said clamp cylinder results in pivotal movement of said clamp head with respect to said slide, wherein said stretching assembly includes a plurality of fabric pins; and further including a robot for transferring the blank from a loading station to the stretching assembly, said robot including a placing tool including a plurality of shot pins arranged to align with said fabric pins when said placing tool is positioned adjacent to said stretching assembly.

2. The apparatus of claim 1, wherein at least one of said shot pins includes a transfer pin and a sleeve, at least one of said transfer pin and said sleeve being movable with respect to said other of said transfer pin and said sleeve, wherein actuation of said shot pin pushes the blank off of said transfer pin and onto a corresponding one of said fabric pins.

3. The apparatus of claim 1, further including an air knife assembly mounted to said robot arm adjacent to said placing tool.

4. The apparatus of claim 3, farther including a stretch measuring assembly mounted to said robot arm adjacent to said placing tool.

5. The apparatus of claim 4, wherein said stretch measuring assembly includes a frame, a plurality of blocks movable mounted to said frame, a plurality of fabric needles mounted to said blocks and a sensor for generating signals indicative of movement of said blocks with respect to said frame.

6. The assembly of claim 1, wherein said springs bias said plate away from said first mold part.

7. The apparatus of claim 1, wherein a strain gauge is disposed between said stretch cylinder and at least one of said plate and said slide to generate signals indicative of a force being applied to the blank.

8. The apparatus of claim 1, wherein said plate defines a plurality of guide holes, said guide holes adapted to be fitted over alignment rods in said first mold part to movably support said plate adjacent to said first mold part.

9. The apparatus of claim 2, wherein each of said transfer pins is selectively retractable within said sleeve.

10. The apparatus of claim 9, wherein said shot pins are pneumatically actuated, wherein a partial vacuum is applied to said shot pins to retract said transfer pins.

11. The apparatus of claim 3, wherein said air knife assembly includes a first nozzle away for expelling pressurized air in a first direction and a second nozzle array for expelling pressurized air in a second direction.

12. The apparatus of claim 5, wherein said sensor is a linear transducer.

13. The apparatus of claim 12, further including a needle guard movable between a closed position covering at least one of said fabric needles and an open position exposing said fabric needle.

14. The apparatus of claim 13, further including a base and a cylinder, said cylinder interconnecting said base and said frame, whereby extension and retraction of said cylinder results in movement of said frame with respect to said base.

15. The apparatus of claim 14, further including at least one alignment rod extending between said frame and said base to address rotation of said frame with respect to said base.

* * * * *